United States Patent
Bury et al.

(10) Patent No.: US 12,513,411 B2
(45) Date of Patent: Dec. 30, 2025

(54) ANTI-FLICKER FILTER MITIGATION FOR AN EVENT-BASED SENSOR

(71) Applicant: PROPHESEE, Paris (FR)

(72) Inventors: Serge Bury, Paris (FR); Xavier Lagorce, Saint-Maur-des-Fossés (FR)

(73) Assignee: PROPHESEE, Paris (FR)

( * ) Notice: Subject to any disclaimer, the term of this patent is extended or adjusted under 35 U.S.C. 154(b) by 272 days.

(21) Appl. No.: 18/336,405

(22) Filed: Jun. 16, 2023

(65) Prior Publication Data
US 2023/0412930 A1    Dec. 21, 2023

(30) Foreign Application Priority Data
Jun. 17, 2022  (EP) .................................... 22305887

(51) Int. Cl.
H04N 23/745    (2023.01)
H04N 25/60     (2023.01)

(52) U.S. Cl.
CPC .......... *H04N 23/745* (2023.01); *H04N 25/60* (2023.01)

(58) Field of Classification Search
CPC ...... H04N 23/745; H04N 25/60; H04N 25/47; H04N 23/81; H04N 25/70; H04N 25/707
USPC ....................................................... 348/226.1
See application file for complete search history.

(56) References Cited

U.S. PATENT DOCUMENTS

| | | |
|---|---|---|
| 7,218,777 B2 | 5/2007 | Asano et al. |
| 7,538,799 B2 | 5/2009 | Yanof |
| 9,432,590 B2 | 8/2016 | Nguyen et al. |
| 9,473,706 B2 | 10/2016 | Malone et al. |
| 10,110,839 B2 | 10/2018 | Mlinar et al. |
| 10,110,840 B2 | 10/2018 | Velichko |
| 10,154,200 B2 | 12/2018 | Rycenga et al. |
| 2019/0362256 A1 | 11/2019 | Lang et al. |

(Continued)

FOREIGN PATENT DOCUMENTS

| | | |
|---|---|---|
| EP | 3151546 B1 | 11/2018 |
| EP | 3518529 A1 | 7/2019 |
| WO | 2019145516 A1 | 8/2019 |

OTHER PUBLICATIONS

Extended European Search Report in European Application No. EP 22305887.6, dated Nov. 14, 2022, 8 pages.

(Continued)

*Primary Examiner* — Lin Ye
*Assistant Examiner* — Chan T Nguyen

(57) ABSTRACT

An apparatus comprising an interface and a processor. The interface may be configured to receive an asynchronous event stream from an event-based sensor. The event stream may comprise a series of pixel locations with a timestamp each generated in response to an autonomous detection by any of a plurality of pixels of the event-based sensor exceeding a threshold. The processor may be configured to detect a characteristic pattern of a flicker event in the event stream and generate an output signal containing a tick result in response to the characteristic pattern of the flicker event. A predicted recurring interval of the flicker event may be determined based on the characteristic pattern. The tick result may comprise future timestamps of the flicker event determined based on the predicted recurring interval for the timestamp of the autonomous detection of a particular one of the pixel locations.

14 Claims, 11 Drawing Sheets

(56) References Cited

U.S. PATENT DOCUMENTS

2021/0044744 A1* 2/2021 Sironi .................. H04N 25/707
2024/0114255 A1* 4/2024 Kaizu .................... H04N 25/47

OTHER PUBLICATIONS

Patel et al., "Effective Flicker Detection Technique Using Artificial Neural Network for Video," Feb. 2017, retrieved from URL<https://www.researchgate.net/publication/318561706_Effective_Flicker_Detection_Technique_Using_Artificial_Neural_Network_For_Video>, 6 pages.

* cited by examiner

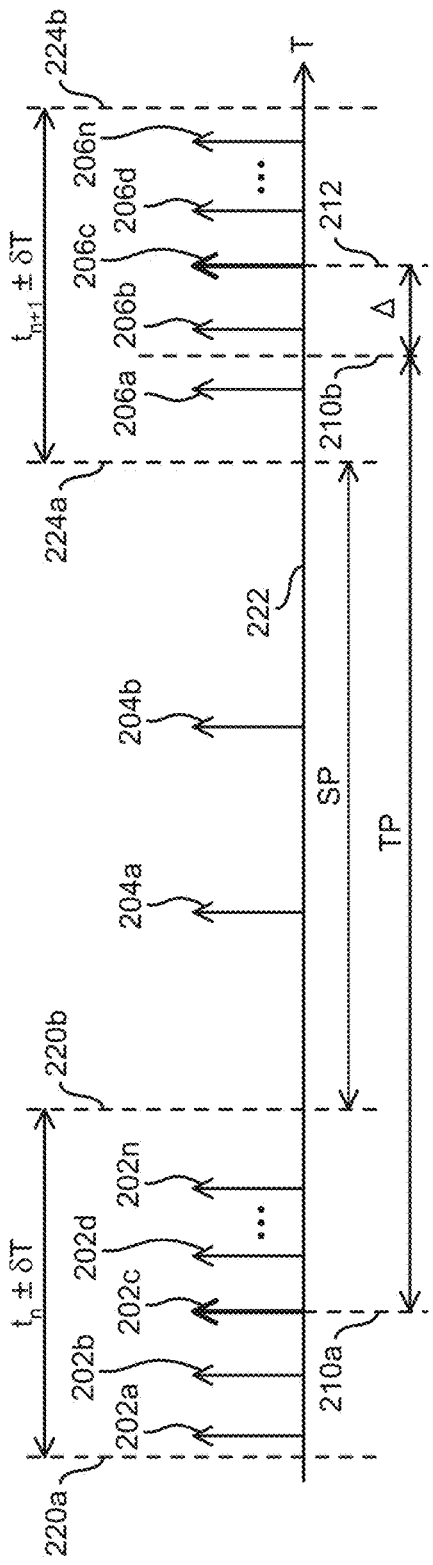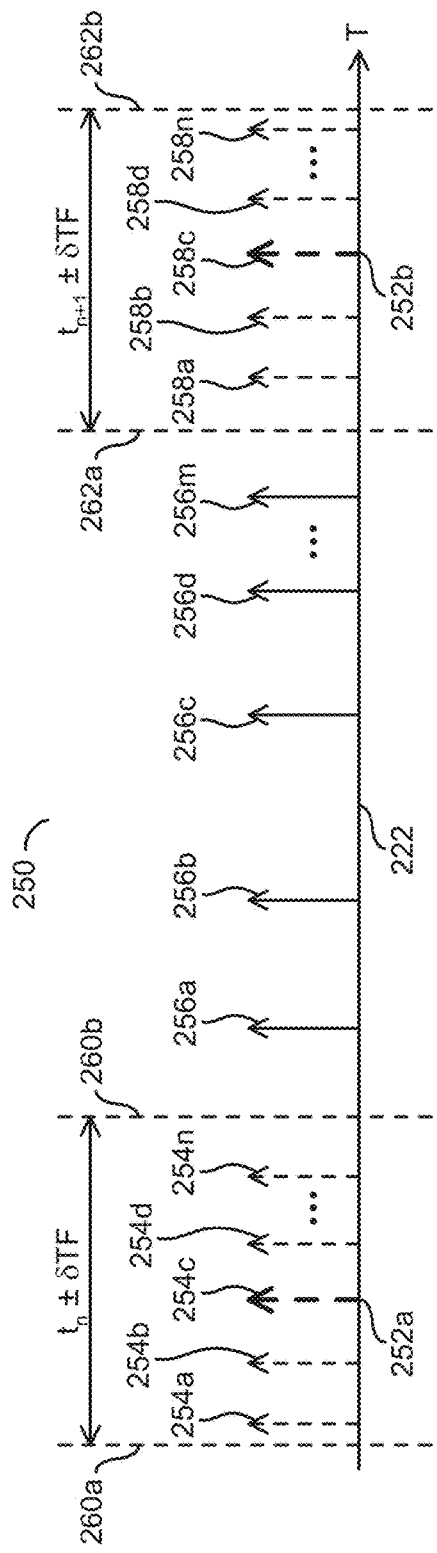

ANTI-FLICKER FILTER MITIGATION FOR AN EVENT-BASED SENSOR

CROSS-REFERENCE TO RELATED APPLICATION

This application is based on and claims priority under 35 U.S.C. 119 to European Patent Application No. EP22305887.6 filed on Jun. 17, 2022, the disclosure of which is herein incorporated by reference in its entirety.

FIELD

The invention relates to event-based sensors generally and, more particularly, to a method and/or apparatus for implementing anti-flicker filter mitigation for an event-based sensor.

BACKGROUND

Cameras that implement an event-based sensor provide an event stream that detects changes in light in real-time. When using an event-based sensor, flickers generate strong and periodical contrast changes that result in high event rates output from the camera. Many scenes captured by a camera have flickering light sources. Examples of flickering light sources include public lights (i.e., 100/120 Hz flicker), halogen light sources, LED or LCD lights, vehicle lights, traffic lights, signs, advertisements (having a manufacturer-dependent frequency), etc. In low light environments, such as at night, or in an indoor setting, a flickering light source might be a dominant, or the only available source of light. Reflective surfaces further amplify flickering in a captured scene.

Generally, flicker events do not convey useful information. Particularly, when digital processing is performed on a captured scene. In an example, flickering light sources can negatively interfere with the performance of computer vision techniques and other post-processing techniques (i.e., scene deblurring, feature and object detection, object tracking, etc.). Flickering light sources can result in many events being generated rapidly, which can flood a bandwidth of the event-based sensor. Rapid inputs that flood the bandwidth can result in a high processing demand on the processing pipeline of the event stream.

The problem is that flicker detection and mitigation has not been considerably explored in the field. Some traditional flicker mitigation detects periodicity of a flicker signal via event polarity changes and drops all input. A key drawback is that once a given pixel block is detected as flickering, all events coming from the pixel block are dropped. Dropping all input from a flickering pixel block leads to sharp divisions between flickering and non-flickering areas in the image with visible artifacts (i.e., the size of artifacts depends on pixel block size). Controlling the degree of flicker filtering (or the output event rate) is difficult. The proposed flicker detection and mitigation is based on filtering of flickering clusters only, and provides mild and easily tunable degree and/or timespan of filtering. The output event rate can be smoothly adjusted.

European Patent Application EP3518529A1 describes gathering flicker statistics from an event-based sensor output, and focuses on extraction of flickering bursts. Filtering of the flicker bursts removes all events from the flickering areas of the image. Moreover, gathering flicker statistics and filtering bursts is not trivial to adapt for extraction and filtering of flicker effects from the whole image (i.e., without per pixel or per spatial block storage). Instead of filtering the flicker bursts and removing all events from the flickering areas of the image, the proposed solution of the present invention provides 'smooth' filtering around cluster centers that can be performed using a low-complexity hardware implementation that may be implemented without RAM.

Flicker removal is a known problem in the field of image frame-based sensors, particularly in high-speed video acquisition and old film restoration (described in: "Flicker Removal and Color Correction for High Speed Videos" by Ali Kanj, available at https://pastel.archives-ouvertesir/). Flicker removal in traditional image-based sensors rely on a palette of techniques such as motion estimation, image registration, block matching, spatial interpolation, etc. All the methods are dependent on the technology unique to image frame-based sensor acquisition (i.e., only synchronous readout results are available from a pixel array of an image sensor). Solutions to flicker mitigation in image frame-based sensors assume luminance (i.e., intensity) is available on a per frame basis and at a fixed frame rate for each pixel. Per frame luminance at a fixed frame rate is not a valid assumption for event-based sensors providing asynchronous events triggered upon local contrast changes. Due to the need to process entire frames sampled at a high rate, the resulting flicker mitigation methods for image frame-based sensors tend to be much more computationally intensive compared to the proposed solution that avoids any redundant temporal or spatial sampling.

Mitigation of flicker artifacts in image frame-based sensors has been addressed in the context of vehicular vision systems. In U.S. Pat. No. 7,218,777, a flicker correction method for a frame-based sensor is proposed, based on accumulation of light intensity histograms per frame (using a moving average histogram). Then, each incoming image frame is gamma-corrected to match a pre-computed and pre-stored moving average. The accumulation of histograms and gamma correction is done synchronously at the frame rate and assuming intensity is available for each pixel of a frame. Both assumptions do not apply to the event-based sensor of the present invention.

U.S. Pat. No. 9,473,706B2 suggests specialized pixel circuitry sampled at a very high readout rate to be used in "flicker detection regions" of the image frame-based sensor. The proposed solution of the present invention applies to event-based sensors and avoids any modification to the pixel design by using a naturally compressed stream of asynchronous events generated by flicker. Sampling data at a very high rate (which is likely to generate pressure on flicker detection circuitry) is avoided.

European Patent EP3151546B1 implements a dynamic shutter for a frame-based image sensor. The dynamic shutter requires a more complex pixel design in order to capture flicker at frequencies higher than the regular frame rate. Approaches in U.S. Pat. Nos. 10,110,839B2, 10,110,839B2, 10,154,200B2 and U.S. Pat. No. 10,110,840B2 also suggest either dynamic shutter control or piecewise interval-based exposure time. Each use substantial modification of the frame-based pixel design for flicker mitigation. The proposed solution of the present invention does not implement an image frame-based sensor.

In "Effective Flicker Detection Technique Using Artificial Neural Network For Video" (2017), by Patel, Ripal & Pandey, Shubha & Patel, Chirag & Paul, Robinson (https://www.researchgate.net/publication/318561706_Effective_Flicker_Detection_Technique Using_Artificial_Neural_Network_For_Video), flicker is detected using a neural network approach for an image-frame based sensor.

The present invention is derived from Phase-Locked Loop (PLL) principles with very limited complexity that does not require neural network learning or supervision.

In U.S. Pat. No. 9,432,590B2, for an image frame-based sensor, flicker frequency is detected as an AC component of an image frame difference. Extraction of flicker frequency relies on a DCT transform. While the approach does not require modification of the pixel circuit design, the design does require discrete transforms applied to the entire image field of view. The proposed solution of the present invention is based on an accumulation of second-order statistics determined directly from the event stream and does not need any discrete transforms, which results in considerably reduced complexity.

U.S. Pat. No. 7,538,799B2 provides a specific weighted averaging to an entire field of view of the video frame of an image frame-based sensor for flicker detection. The proposed solution of the present invention does not need to analyze the entire field of view.

It would be desirable to implement anti-flicker filter mitigation for an event-based sensor.

SUMMARY

The invention concerns an apparatus comprising an interface and a processor. The interface may be configured to receive an asynchronous event stream from an event-based sensor. The asynchronous event stream may comprise a series of pixel locations with a timestamp each generated in response to an autonomous detection by any one of a plurality of pixel circuits of the event-based sensor exceeding a threshold. The processor may be configured to detect a characteristic pattern of a flicker event in the asynchronous event stream and generate an output signal containing a tick result in response to the characteristic pattern of the flicker event. A predicted recurring interval of the flicker event may be determined based on an analysis of the characteristic pattern. The tick result may comprise one or more future timestamps of the flicker event determined based on the predicted recurring interval for the timestamp of the autonomous detection of a particular one of the pixel locations.

In some embodiments of the apparatus aspect described above, the predicted recurring interval is determined during a lock to the flicker event. The lock is determined when the timestamp of the flicker event is repeatedly detected during a pre-determined period of time. The lock to the flicker event during the pre-determined period of time is verified based on an analysis of the characteristic pattern to ensure the flicker event comprises a periodical pattern.

In some embodiments of the apparatus aspect described above, before the lock to the flicker event, the processor is configured to select a sync period that is large enough to capture at least one instance of the flicker event and short enough to select only one instance of the flicker event. The processor switches from the sync period to the lock to the flicker event in response to detecting that the characteristic pattern as stable.

In some embodiments of the apparatus aspect described above, the processor is configured to detect that the characteristic pattern is stable in response to implementing a counter that is incremented when a period for the predicted recurring interval is validated and is decremented when the period for the predicted recurring interval is not validated and comparing the counter to a tunable threshold value.

In some embodiments of the apparatus aspect described above, the period for the predicted recurring interval is validated by performing a comparison of the period to an expected range of possible flicker source periods.

In some embodiments of the apparatus aspect described above, post-processing of the flicker event is only performed based on the tick result while the lock is verified.

In some embodiments of the apparatus aspect described above, the output signal is presented to a circuit. The circuit is configured to perform processing operations in response to the tick result.

In some embodiments of the apparatus aspect described above, the output signal is configured to enable the tick result to be predicted for each of the pixel circuits as the predicted recurring interval occurs instead of waiting for a full video frame to be generated.

In some embodiments of the apparatus aspect described above, the flicker event comprises a change in luminance of a light input detected by the event-based sensor that occurs at one or more of the pixel locations at a frequency that creates a pulsing effect. The processor is further configured to suppress the change in luminance during the predicted recurring interval of the tick result. The tick result is suppressed by dropping all input from the asynchronous event stream that occurs within a range of time around the tick result.

In some embodiments of the apparatus aspect described above, the characteristic pattern of the flicker event comprises a brightness fluctuation that follows a periodical pattern in a range of 10 Hz to 1000 Hz.

In some embodiments of the apparatus aspect described above, the characteristic pattern of the flicker event is detected in response to a detection section of time comprising a cluster of contrast changes of the autonomous detection at one of the pixel locations, a silence section of time that does not comprise the contrast changes of the autonomous detection at the one of the pixel locations, a repetition of the detection section of time and the silence section of time and the predicted recurring interval for the tick result is selected based on the timestamp of the autonomous detection being a middle time of the detection section of time.

In some embodiments of the apparatus aspect described above, the tick result is validated in response to comparing a first number of occurrences of the autonomous detection at the one of the pixel locations within the detection section of time to a first predetermined threshold, comparing a second number of occurrences of the autonomous detection in the cluster of contrast changes within a deviation time to a second predetermined threshold and comparing a ratio of occurrences of the autonomous detection at the one of the pixel locations between the detection section of time and the silence section of time to a third predetermined threshold.

In some embodiments of the apparatus aspect described above, the processor is further configured to correct the tick result in response to determining a neighborhood of events in the asynchronous event stream close to the tick result, calculating an average timestamp offset of the timestamp of each occurrence of the autonomous detection in the neighborhood of events from the tick result and adding the average timestamp offset to the predicted recurring interval for the tick result.

In some embodiments of the apparatus aspect described above, the tick result is generated for a region of interest of the event-based sensor and the region of interest comprises a plurality of the pixel locations.

In some embodiments of the apparatus aspect described above, the plurality of the pixel locations corresponds to all of the pixel circuits of the event-based sensor.

BRIEF DESCRIPTION OF THE DRAWINGS

Embodiments of the invention will be apparent from the following detailed description and the appended claims and drawings.

FIG. 6 is a diagram illustrating timing data for clusters of events in a flicker event;

FIG. 7 is a diagram illustrating flicker mitigation of clusters of events that occur within a neighborhood of a tick event;

DETAILED DESCRIPTION

Figure 1:
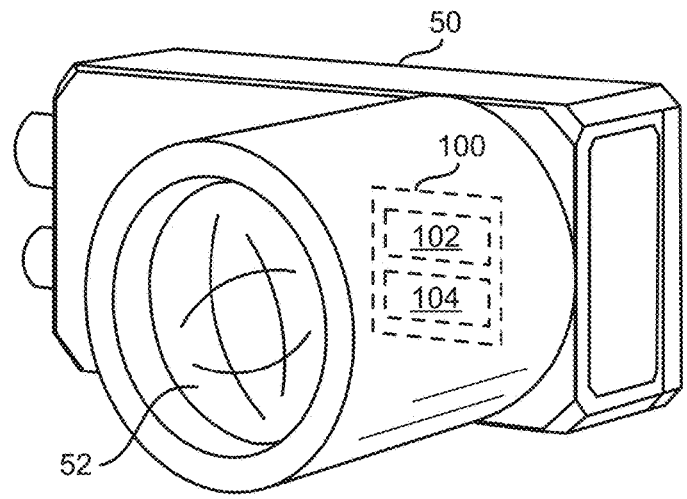
FIG. 1 is a diagram illustrating an example embodiment of the present invention.

Embodiments of the present invention include providing anti-flicker filter mitigation for an event-based sensor that may (i) be determined from second order statistics received in an event stream, (ii) be implemented with low-complexity hardware that does not modify pixel circuits of an event-based sensor, (iii) filter clusters of events, (iv) prevent flooding of an event-based sensor, (v) provide a tick result comprising predicted flicker events, (vi) ensure a lock to a period of a flicker event, (vii) compensate for a time drift of flicker events, (viii) apply to a single pixel, a group of pixel or an entire field of view of an event stream, (ix) validate a cluster of events around a flicker event using statistical criteria, (x) enable events that occur between flicker events to be captured and/or (xi) be implemented as one or more integrated circuits.

Embodiments of the present invention may be configured to enable flicker detection and/or flicker mitigation of an event stream generated by an event-based (EB) sensor. Flickering may be detected as flicker events. Flicker events may be detected in the event stream and upcoming flicker events may be predicted and filtered.

Flickering may comprise any brightness fluctuation that follows a periodical pattern. A characteristic pattern of a pixel, group of pixels and/or an entire field of view may be detected in an event stream. The characteristic pattern may be analyzed to lock on to a periodical pattern that may represent flickering. The flickering of an order of tens or several hundreds of Hertz may be captured in an event stream by an EB sensor. For example, flickering may be caused by artificial light sources (e.g., public and indoor lighting, vehicle headlights, LEDs, LCD screens, etc.). Generally, flickering lights sources follow an ON/OFF (or HIGH/LOW) periodical brightness pattern. In one example, a periodical pattern of ON and OFF events may be captured over time in a region of interest of an EB sensor in a scene with a rotating fan in a strong 100 Hz flickering light. A periodical pattern induced by flicker reflected from the fan may be captured, on top of expected events due to the rotation of the fan.

Embodiments of the present invention may be configured to detect a cluster of events that may correspond to a flicker event and predict a recurring interval for the flicker events in order to predict future occurrences of the flicker event. In order to prevent issues caused by flickering light sources, flicker mitigation may be implemented for the EB sensor. The flicker mitigation implemented may be configured to exploit the periodicity of event clusters generated by a flicker signal. By determining the periodicity of event clusters for the flicker signal, the flicker mitigation implemented may enable the filtering of only flickering clusters instead of all events. The timespan (or degree) of filtering may be tunable to enable a smooth adjustment to the output event rate. The smooth filtering performed may enable clusters of events around a center of the flicker event to be removed instead of removing all events from a flickering pixel (or area).

The flicker detection and/or mitigation may be implemented using low-complexity hardware in an EB sensor. In an example, the flicker detection may be implemented without utilizing random-access memory (e.g., SRAM). The flicker detection and/or mitigation may be implemented without modifying a design of the pixel circuits of the EB sensor. The limited complexity of the flicker detection and/or mitigation may enable a scalable implementation that may be adapted to a large number of flicker sources and/or contexts to be stored.

The flicker detection and/or mitigation without modification to the design of the pixel circuits may be implemented by analyzing a naturally compressed stream of asynchronous events generated by an EB sensor that may comprise a flickering light source. Filtering the flicker events may prevent a processor from sampling data at a high rate (e.g., sampling data at a high rate may generate pressure on flicker detection circuitry, which may flood bandwidth). The flicker detection and/or mitigation may be performed based on principles of a phase-locked loop to limit complexity. For example, the flicker detection may be performed without neural network learning or supervision. In an example, the flicker detection may accumulate second-order statistics determined directly from an event stream without performing discrete transforms.

EB sensors may be implemented without high frame-per-second sampling. The EB sensors may generate an asynchronous stream of events. By analyzing the asynchronous stream of events, the flicker mitigation may be performed on a per-pixel basis instead of processing a full image frame. Analyzing a characteristic pattern of potential flicker events may enable a dynamic estimation of an event cluster width. Smooth filtering with minimal artifacts may be implemented by filtering only events within the predicted event cluster width. Events that occur outside of the predicted event cluster width may be preserved. A tick result may provide a prediction of the event cluster. The tick result may be easily tunable. The portion of events that occur around the tick result may be filtered out. The output event rate may be controlled in a wide range.

Characteristics of a flicker pattern may be detected based on statistics derived directly from the event stream generated by the EB sensor. The flicker detection may be configured to extract a fundamental frequency of a pixel, a block of pixels or an entire image. A lock to the fundamental frequency may be achieved based on principles of a phase-locked loop. By locking to a fundamental frequency of a flicker event, the flicker detection and/or mitigation may be robust with respect to eventual scene events that may effectively break the flickering pattern. For example, the lock to the fundamental frequency may be maintained even if there are other events in a captured scene, provided there are enough event clusters to maintain the lock. An arbitrary frequency present in the event stream may be detected rather than only detecting whether a pre-selected frequency is present or not.

Embodiments of the present invention may be configured to detect flicker events. For a particular event polarity that occurs at a particular pixel, contrast changes resulting from flicker events may create an event cluster. The event cluster may comprise a succession of events in the event stream of the same polarity closely packed in time. The event cluster may be followed by an amount of time that does not comprise events related to the flicker event (e.g., a silence period). After the silence period, another cluster of events may occur, then a silence period, then another cluster of events, etc. (e.g., a repetition of a detection section with a cluster of events and the silence period/section). The flicker detection may be configured to detect and lock onto the characteristic pattern of the flicker event. The flicker event may be detected for an individual pixel, a group of pixels, and/or the entire field of view of the EB sensor.

In response to detecting the characteristic pattern of the flicker event, a stability of the characteristic pattern may be verified according to a pre-determined criterion. In an example, the characteristic pattern may be verified based on analyzing whether the characteristic pattern is stable for a sufficiently prolonged duration, whether the flicker period is in a desired range, whether the cluster of events are sufficiently grouped together, etc. A lock state may be determined when the characteristic pattern is verified. In the lock state, future occurrences (e.g., timestamps) of the event clusters (or bursts) that correspond to the detected flicker event may be predicted. The predicted timestamps around which the flicker events may be clustered may be a tick result.

The tick results may be generated for analysis (e.g., post-processing). In one example, the tick results may be used to filter out the flicker events. For example, all events that occur within a fixed time interval of events around the tick result may be filtered out. In another example, an average time spread of the event cluster around the tick result may be estimated. For example, the average time spread may be used to dynamically adjust the filtered interval. Dynamically adjusting the filtered interval may enable the flicker mitigation to adapt to a cluster width, which may depend on a number of factors (e.g., flicker intensity, ambient (static) light level, pixel response, etc.). The tick results may be used to track an evolution of the estimated flicker period. For example, timestamps of future ticks may be adjusted according to the evolution of the estimated flicker period.

In some embodiments, a fundamental flickering frequency of an entire field of view may be detected and locked to. For example, one flicker source may be detected, tracked and filtered based on a storage of only one context for the entire field of view of the EB sensor. In terms of hardware and/or computational complexity, detecting the fundamental frequency of the entire field of view of the EB sensor may be the most economical.

In some embodiments, the field of view of the EB sensor may be divided into blocks (or patches, or sub-regions). Different instances of the flicker mitigation may be performed of each block. For example, performing flicker mitigation on a per block basis may enable detecting, locking to, and tracking multiple flicker sources. Storage of a separate context per block may be implemented to enable flicker mitigation on a per block basis. Similarly, intermediate configurations may be implemented (e.g., assuming only one flicker source, but storing a limited context (e.g., an estimated cluster size) per block).

The tick results may be configured to enable a generation of flicker statistics of the scene. For example, the flicker statistics may be used for monitoring a scene. A flicker frequency and/or an estimated size of event clusters may be generated (e.g., without necessarily performing filtering). In an example, the statistics generated may be separately available per event (ON or OFF) polarity. The post-processing performed in response to the tick results may be varied according to the design criteria of a particular implementation.

DETAILED DESCRIPTION present invention is shown. A camera 50 is shown. The camera 50 may comprise a lens 52, and a block (or circuit or apparatus) 100. The apparatus 100 may comprise hardware of the camera 50. The apparatus 100 may be configured to implement anti-flicker filter mitigation for an event-based sensor. The apparatus 100 may be configured to perform other functionality for the camera 50 (e.g., generate an output, provide a digital interface, provide a user interface, etc.).

The apparatus 100 may comprise a block (or circuit) 102 and/or a block (or circuit) 104. The circuit 102 may implement an event-based (EB) sensor. The circuit 104 may implement a digital processor. The apparatus 100 may comprise other components (not shown). The number, type and/or arrangement of the components of the apparatus 100 may be varied according to the design criteria of a particular implementation.

The camera 50 may be configured as a capture device configured to capture light input from an environment. The lens 52 may be implemented as an optical lens. The lens 52 may provide a zooming feature and/or a focusing feature. The lens 52 may be configured to focus light onto the EB sensor 102. The lens 52 may be directed, tilted, panned, rotated and/or zoomed in order to capture a field of view of the environment near the camera 50. The EB sensor 102 may be located behind the lens 52 in order to receive the focused light. The lens 52 may be aimed to capture the light in the environment. In an example, the lens 52 may be a wide-angle lens and/or fish-eye lens (e.g., a lens capable of capturing a wide angle field of view). The lens 52 may provide an optical alignment between the EB sensor 102, the optical barrel and body of the camera 50. The lens 52 may be swappable (e.g., to an 8 mm lens, a telescope lens, a microscope lens, etc.) The implementation of the lens 52 may be varied according to the design criteria of a particular implementation.

The EB sensor 102 may be configured to receive the focused light input via the lens 52. The EB sensor 102 may comprise circuitry configured to convert the focused light input into a bitstream. The bitstream generated by the EB sensor 102 may be an asynchronous event stream. In one example, the event stream generated by the EB sensor 102 may be communicated as an output from the camera 50. In another example, the event stream may be communicated to the processor 104. In some embodiments, the EB sensor 102 may provide a pixel resolution of 1280×720, with an optical format of 1/2.5". In an example, the EB sensor 102 may provide a pixel latency of approximately 220 μs and a dynamic range of greater than 86 dB. The EB 102 may be configured to provide a nominal contrast threshold of 25%. The specifications and/or capabilities of the EB sensor 102 may be varied according to the design criteria of a particular implementation.

The processor 104 may be configured to receive the event stream. The processor 104 may be configured to perform one or more digital operations on the event stream. For example, the processor 104 may be a digital processing block. The processor 104 may be configured to provide embedded event signal processing. In an example, the processor 104 may be configured to perform post-processing on the event stream. In some embodiments, the processor 104 may be configured to receive other input (e.g., audio input received from a microphone, user input from a human-interface device, movement input from an inertial sensor, etc.).

The processor 104 may be configured to execute computer readable instructions. The computer readable instructions may be executed to perform a number of steps. The processor 104 may be configured to generate an output in response to performing the computer readable instructions on the event stream and/or other input. In an example, the processor 104 may be configured to generate a post-processed event stream. The processor 104 may be configured to packetize the output to a digital interface (e.g., an HDMI output, a USB output, an ethernet output, a Wi-Fi output, etc.). The operations performed, the input received and/or the output generated by the processor 104 may be varied according to the design criteria of a particular implementation.

In some embodiments, the processor 104 may be implemented as an ARM processor, an x86-64 processor, a RISC-V processor, etc. In some embodiments, the processor 104 may be implemented as System-on-Chip (SoC). In some embodiments, the processor 104 may be a customized ASIC. In some embodiments, the processor 104 may be implemented using an FPGA.

In some embodiments, the processor 104 may be implemented on an external computing device (e.g., a desktop computer, a laptop computer, a netbook, a tablet computing device, a smartphone, etc.) and the event stream may be communicated to the external device for processing by the processor 104. In some embodiments, the processor 104 may be integrated inside the EB sensor 102. In some embodiments, the processor 104 may implement a neuromorphic processor (e.g., a neural network accelerator) and/or a customized processing core implementing a specific functionality (e.g., Event-Signal-Processor (ESP)). In some embodiments, the flicker detection/mitigation may be implemented as part of the processor 104 implemented with the EB sensor 102 within the camera 50. In some embodiments, the flicker detection/mitigation may be provided as software and/or firmware that may be executed by the processor 104. For example, the flicker detection/mitigation may comprise computer readable instructions that may be executed by the processor 104.

In the example shown, the camera 50 may be an illustrative example of a device implementing the apparatus 100. For example, the camera 50 may be a handheld camera that may be operated by a person. In another example, the camera 50 may be mounted to a tripod and/or a gimbal. In some embodiments, the camera 50 may be mounted to a stationary object (e.g., a wall-mounted security camera). In some embodiments, the camera 50 may be mounted to a moving object (e.g., a vehicle). In an example, the event stream generated by the EB sensor 102 of the camera 50 may provide another set of data in addition to data sources provided by other sensors (e.g., PIR sensors, motion sensors, radar, lidar, a frame-based camera, etc.). In some embodiments, the event stream may be configured to replace the other types of sensors. In an example, the event stream provided by the EB sensor 102 may enable the camera 50 to be installed in a vehicle as a low-cost replacement to more expensive technologies (e.g., radar, lidar, frame-based sensors, etc.). In some embodiments, the camera 50 may comprise ultra compact dimensions (e.g., with multiple fixing points in order to fit in space-constrained system. The implementation of the camera 50 may be varied according to the design criteria of a particular implementation.

Figure 2:
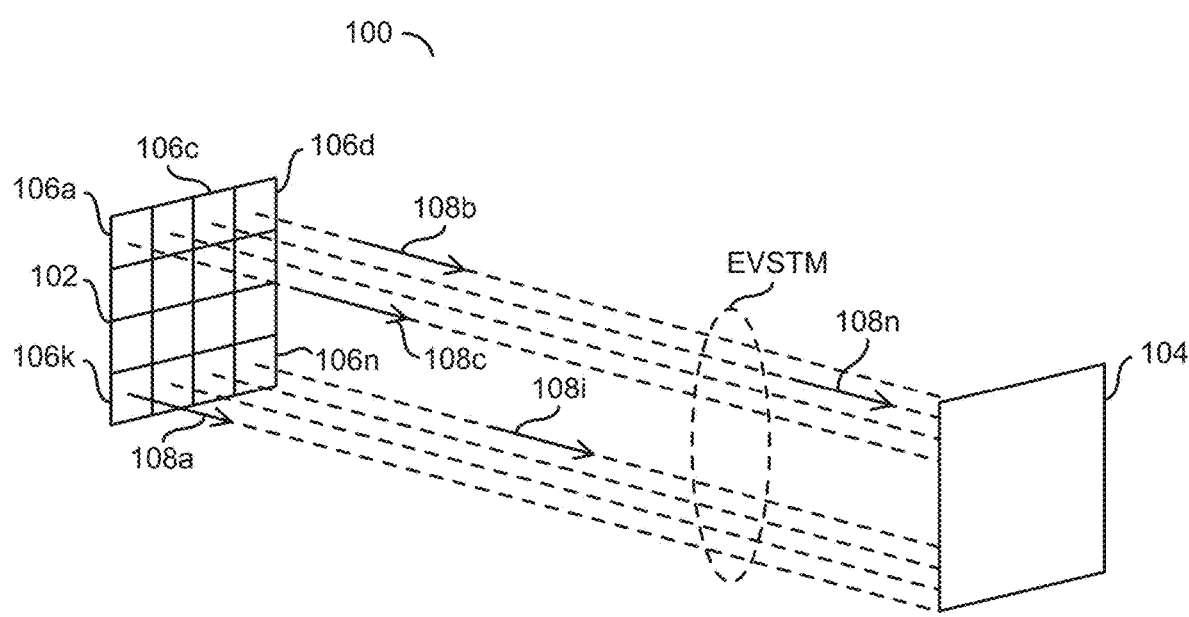
FIG. 2 is a diagram illustrating an event-stream generated by an event-based sensor.

Referring to FIG. 2, a diagram illustrating an event-stream generated by an event-based sensor is shown. Data communication in the apparatus 100 is shown. A signal (e.g., EVSTM) is shown. The signal EVSTM may be the asynchronous event stream. The event stream EVSTM may be communicated from the sensor 102 to the processor 104. The data communication shown for the event stream EVSTM between the EB sensor 102 and the processor 104 may be a simplified model provided for illustrative purposes.

The EB sensor 102 is shown comprising a number of blocks 106a-106n. The blocks 106a-106n may comprise pixels of the EB sensor 102. For example, the pixels 106a-106n may represent individual pixel circuits of the EB sensor 102 each comprising a photosensitive element and a detector circuit. In the example shown, the EB sensor 102 may comprise sixteen pixels (e.g., a 4×4 grid). In some embodiments, the pixels 106a-106n may be implemented as a square grid. In some embodiments, the pixels 106a-106n may comprise a wide rectangle. The EB sensor 102 may comprise more pixels 106a-106n than shown. In an example, the EB sensor 102 may comprise a 1280×720 arrangement of the pixels 106a-106n (e.g., for a standard 1MPixel event-based camera). In an example, the pixels 106a-106n may provide a pixel size of approximately 4.86× 4.86 μm. The number, shape and/or arrangement of the pixels 106a-106n of the EB sensor 102 may be varied according to the design criteria of a particular implementation.

The event stream EVSTM may comprise a number of events 108a-108n. The events 108a-108n may be generated by any of the pixels 106a-106n. In the example shown, for simplicity, only the pixels 106a-106d and the pixels 106k-106n are shown communicating the events 108a-108n. Generally, each of the pixels 106a-106n may be configured to communicate the events 108a-108n. In the example shown, the events 108a-108n are shown communicated to the processor 104 separately for illustrative purposes. In some embodiments, the events 108a-108n generated by the EB sensor 102 may be quickly serialized after the pixels 106a-106n to generate the event stream EVSTM. In some embodiments, wafer stacking may be implemented between the pixels 106a-106n and the processor 104.

In the example shown, the event stream EVSTM may comprise the event 108a generated by the pixel 106k, the events 108b-108c generated simultaneously by the pixel 106d and the pixel 106a respectively, the event 108i generated by the pixel 106n and the event 108n generated by the pixel 106c. The event stream EVSTM may comprise a series of the events 108a-108n. The number and/or timing of the events 108a-108n generated by the pixels 106a-106n may be varied according to the light captured of the environment.

The event stream EVSTM may comprise the asynchronous events 108a-108n triggered in response to contrast changes detected by the EB sensor 102. Each of the pixels 106a-106n may detect a local contrast change in the light input. Since the events 108a-108n may be generated asynchronously, the event stream EVSTM may provide the events 108a-108n in response to the local contrast changes without producing an entire frame at a pre-determined rate. The asynchronous generation of the events 108a-108n may enable the event stream EVSTM to provide the change in the light input at the pixels 106a-106n without redundant temporal or spatial sampling.

The events 108a-108n may comprise at least a pixel location. For example, the pixel location may comprise an x/y address of the location of the one of the pixels 106a-106n in the array of the EB sensor 102 that generated the particular one of the events 108a-108n. In some embodiments, the events 108a-108n may further comprise a timestamp. For example, the events 108a-108n may indicate the location and the time that the pixels 106a-106n detected the contrast change. In some embodiments, the events 108a-108n may comprise polarity information. For example, the events 108a-108n may comprise polarity information about the contrast change. For example, the events 108a-108n may comprise the location and the polarity information about the contrast change detected by the pixels 106a-106n. Timestamps and polarity information may be optional data for the events 108a-108n. In one example, the EB sensor 102 may generate the events 108a-108n without the timestamps and/or the polarity information encoded in the event stream EVSTM. In some embodiments, the EB sensor 102 may encode the events 108a-108n in the event stream EVSTM in an AER (address-event representation) format. In some embodiments, the EB sensor 102 may encode the events 108a-108n in the event stream EVSTM with each of the location, the timestamp and the polarity information. The format of the events 108a-108n in the event stream EVSTM may be varied according to the design criteria of a particular implementation.

The asynchronous event stream EVSTM may comprise a series of the pixel locations, each with a timestamp. Each of the events 108a-108n may be generated in response to an autonomous detection by any one of a plurality of the pixels 106a-106n of the event-based sensor 102 exceeding a threshold. The threshold may be local contrast change detected by the pixels 106a-106n. A contrast change detected that is below the threshold may not trigger a generation of one of the events 108a-108n.

The pixels 106a-106n may be actively detected to enable the pixels 106a-106n to operate autonomously (e.g., the pixels 106a-106n are not sampled). Circuitry for the pixels 106a-106n may continuously monitor a voltage signal (e.g., generated by a photoreceptor comprising a photodiode and multiple other components (e.g., transistors)). For example, the photoreceptor may translate a photocurrent (e.g., proportional to the instantaneous light level impinging on the photodiode) logarithmically into a pixel-internal voltage signal (e.g., the pixel-internal voltage signal may be logarithmically proportional to the light input). The voltage signal may be monitored for deviations from a previously stored voltage level exceeding one or more thresholds. The detection of the voltage signal crossing the threshold may result in a generation of one of the events 108a-108n. After one of the pixels 106a-106n generates one of the events 108a-108n, the pixel that generated the event may reset to the current light level and continue monitoring for new deviations exceeding the threshold(s). The autonomous operation of the pixels 106a-106n may not use external timing signals (e.g., no sampling clock) to govern the operation of the pixels 106a-106n. In an example, the pixels 106a-106n may operate similar to an amplitude-domain level-crossing sampler with respect to the photoreceptor voltage signal (or an asynchronous delta modulator (ADM) operation). The photocurrent may continuously change with the light impinging on the photodiode of the pixels 106a-106n.

In some embodiments, a sensitivity of the pixels 106a-106n may be derived through a sensitivity setting for the EB sensor 102 (e.g., through characterization). For example, an assumption may be made that each of the events 108a-108n may measure the exact value of the sensitivity setting. The result may be noisy due to pixel variability of the pixels 106a-106n. However, the change from another source may be estimated (e.g., all of the events 108a-108n generated between two standard video frames may be related to the intensity changes of the video frame using an online calibration of what the pixels 106a-106n detect). Generally, the useful information in the event stream EVSTM may be the presence of an edge at a pixel location at an exact time (e.g., the amplitude of the intensity change may not be important information). In one example, the presence of an edge may be useful for tracking and/or optical flow.

Figure 3:
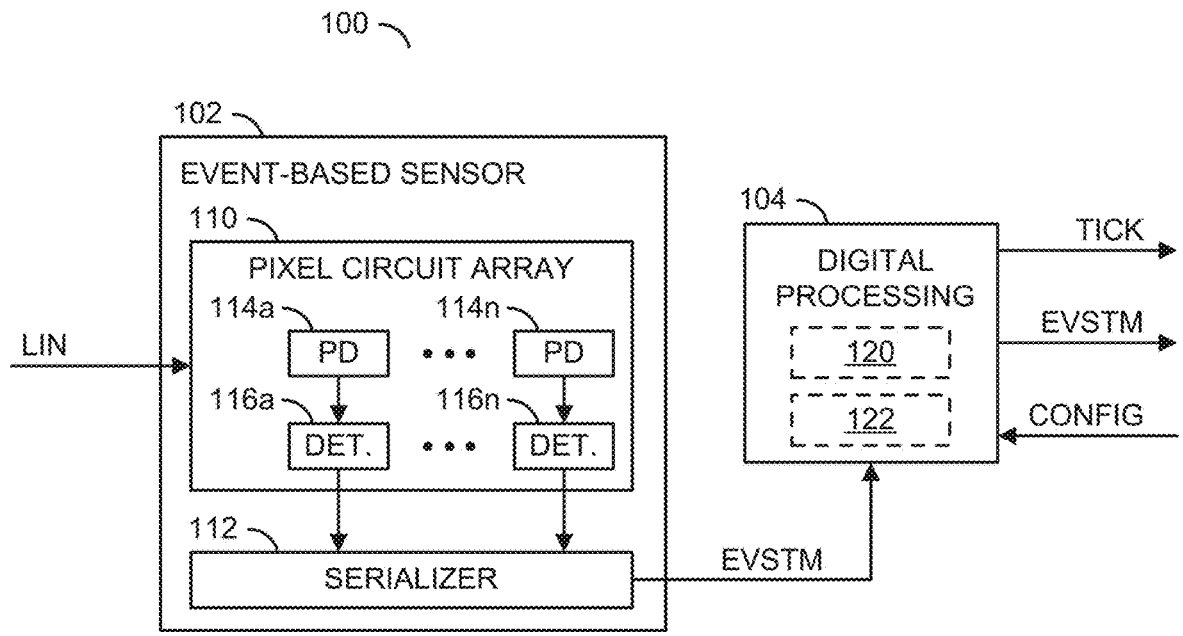
FIG. 3 is a block diagram illustrating a tick result generated in response to an event stream.

Referring to FIG. 3, a block diagram illustrating a tick result generated in response to an event stream is shown. A block diagram of the apparatus 100 is shown. The apparatus 100 is shown comprising the EB sensor 102 and the processor 104. In the example shown, the apparatus 100 may implement the EB sensor 102 and the digital processor 104 as separate components.

The apparatus 100 may receive a signal (e.g., LIN) and a signal (e.g., CONFIG). The apparatus 100 may generate a signal (e.g., TICK) and the event stream EVSTM. The signal LIN may comprise light input. The light input LIN may be received by the EB sensor 102. The signal CONIFG may comprise a configuration input. In an example, an end-user may adjust tunable values for the apparatus 100 by providing various parameters in the signal CONFIG. For example, the signal CONFIG may be provided by connecting the apparatus 100 to a human interface device (e.g., a computer) over a wired connection and/or by providing input using a wireless connection (e.g., a companion application for a smartphone). The signal TICK may comprise one or more tick results. The signal TICK may be generated by the processor 104. The apparatus 100 may be configured to receive other input signals and/or generate other input signals (not shown). The number, type and/or data carried by the input signals received by and/or output signals generated by the apparatus 100 may be varied according to the design criteria of a particular implementation.

The EB sensor 102 may comprise a block (or circuit) 110 and/or a block (or circuit) 112. The circuit 110 may implement a pixel circuit array. The circuit 112 may implement a serializer. The EB sensor 102 may comprise other components (not shown). The number, type and/or arrangement of the components of the EB sensor 102 may be varied according to the design criteria of a particular implementation.

The pixel circuit array 110 may be configured to implement an array of the pixels 106a-106n shown in association with FIG. 2. The pixel circuit array 110 may comprise a number of blocks (or circuits) 114a-114n and/or a number of blocks (or circuits) 116a-116n. The circuits 114a-114n may implement photosensitive elements and/or other components. The circuits 116a-116n may comprise detector circuits. The pixel circuit array 110 may comprise other components (not shown). The number, type and/or arrangement of the components of the pixel circuit array 110 may be varied according to the design criteria of a particular implementation.

The photosensitive elements 114a-114n may be configured to react in response to the light input LIN. In an example, the photosensitive elements 114a-114n may be a photodiode component of a photoreceptor along with other components (e.g., transistors). The photosensitive elements 114a-114n may be configured to generate a photocurrent in response to the level of the light of the light input LIN. The photocurrent generated by the photosensitive elements 114a-114n may be proportional to the instantaneous light level of the light input LIN.

The detector circuits 116a-116n may be electrically connected to the respective photosensitive elements 114a-114n. The detector circuits 116a-116n may be configured to generate the events 108a-108n. The events 108a-108n may be generated by the detector circuits 116a-116n in response to an analog signal (e.g., the photocurrent and/or the voltage signal derived from the photocurrent) that is proportional to a brightness of the light input LIN matching a condition (e.g., the threshold).

In an example, the photosensitive elements 114a-114n may be a photodiode implemented by a photoreceptor. The photoreceptor may logarithmically translate the photocurrent generated by the photodiode into a voltage signal. For example, the voltage signal may be derived from the amount of light exposure of the light input LIN on the photodiode. The detector circuits 116a-116n may be transient detectors configured to detect a change in the voltage signal from the photoreceptor. Each of the detector circuits 116a-116n may generate the respective event signals 108a-108n autonomously and independently of the other detector circuits 116a-116n.

In an example, a combination of one of the respective photosensitive elements 114a-114n with one of the respective detector circuits 116a-116n may correspond to one of the pixels 106a-106n shown in association with FIG. 2. The combination of one of the respective photosensitive elements 114a-114n with one of the respective detector circuits 116a-116n may be a pixel circuit. For example, the pixel 106a may generate one of the event signals 108a-108n in response to the photosensitive element 114a and the detector circuit 116a, the pixel 106b may generate one of the event signals 108a-108n in response to the photosensitive element 114b and the detector circuit 116b, etc. Each combination of one of the respective photosensitive elements 114a-114n and one of the respective detector circuits 116a-116n may correspond to one pixel location of the pixel circuit array 110. For example, the x/y location of the photosensitive elements 114a-114n may be encoded as part of the event stream EVSTM.

The serializer 112 may be configured to receive the events 108a-108n from the detector circuits 116a-116n. The events 108a-108n may be generated independently and asynchronously. The serializer 112 may be configured to format the events 108a-108n into the event stream EVSTM. For example, the serializer 112 may be configured to insert the events 108a-108n into the event stream EVSTM in order of reception. The event stream EVSTM may comprise a series of the events 108a-108n. The events 108a-108n may comprise at least the pixel locations. The events 108a-108n may further comprise a timestamp indicating when the events 108a-108n were generated and/or polarity information. The serializer 112 may present the event stream EVSTM to the processor 104.

The processor 104 may receive the event stream EVSTM. The processor 104 may generate the signal TICK in response to the event stream EVSTM. The processor 104 may pass through the event stream EVSTM as an output. In some embodiments, the processor 104 may be configured to perform various processing features on the event stream EVSTM (e.g., filtering) and output a processed version of the event stream EVSTM.

The processor 104 may comprise a block (or circuit) 120 and/or a block (or circuit) 122. The circuit 120 may comprise computer readable instructions and/or firmware. The circuit 122 may comprise a memory. The processor 104 may comprise other components (not shown). In an example, the processor 104 may be implemented as an SoC comprising an on-chip memory that stores the computer readable instructions 120. The number, type and/or arrangement of the components of the processor 104 may be varied according to the design criteria of a particular implementation.

The processor 104 may execute the computer readable instructions 120. The computer readable instructions 120 may comprise a number of steps that may be performed by the processor 104. The computer readable instructions 120 may be configured to implement the flicker detection and/or mitigation. In an example, in response to executing the computer readable instructions 120, the processor 104 may be configured to detect a characteristic pattern of a flicker event in the event stream EVSTM and generate the output signal TICK comprising the tick result in response to the characteristic pattern of the flicker event. In another example, in response to executing the computer readable instructions 120, the processor 104 may be configured to determine a predicted recurring interval of the flicker event in response to the characteristic pattern of the flicker event in the event stream EVSTM. The signal TICK may comprise the future timestamps of the flicker event determined based on the predicted recurring interval for the timestamp of the autonomous detection of a particular one of the pixels 106a-106n. The camera 50 may be configured to capture the light input LIN of a scene. The EB sensor 102 may be exposed to the scene that may have one or more flickering light sources. The contrast changes in the light input LIN may cause the pixels 106a-106n (e.g., the photosensitive elements 114a-114n and the detector circuits 116a-116n) to generate the events 108a-108n which may be communicated to the processor 104 in the event stream EVSTM. For example, the event stream EVSTM may comprise the per pixel position (e.g., x/y coordinates), a timestamp of the contrast change and/or a change in polarity (e.g., p). Some of the events 108a-108n in the event stream EVSTM may comprise contrast changes caused by flickering light sources (e.g., the flicker events). The processor 104 may be configured to execute the computer readable instructions 120 to detect and/or filter out the flicker events (e.g., undesirable events). In some embodiments, the processor 104 may output the tick results that correspond to the flicker events (e.g., the signal TICK). In some embodiments, the processor 104 may perform the flicker filtering and output a filtered version of the event stream EVSTM.

The memory 122 may be configured to store data. In an example, the memory 122 may implement a static random access memory (e.g., SRAM). The memory 122 may be configured to store events and/or context information to enable the processor 104 to perform pattern detection and/or flicker filtering. In an example, the memory 122 may enable flicker filtering to be performed on multiple blocks and/or individual pixels of the EB sensor 102. In some embodiments, the memory 122 may be configured to store the computer readable instructions 120. In some embodiments, the memory 122 may be configured to store various tunable thresholds and/or parameters presented by the signal CONFIG. 1n the example shown, the memory 122 is implemented as a component of the processor 104. In some embodiments, the memory 122 may be a component external to and accessible by the processor 104 (e.g., a discrete RAM module). The size, type and/or capacity of the memory 122 may be varied according to the design criteria of a particular implementation.

The flicker detection performed by the processor 104 may be configured to detect flicker events for a single one of the pixel locations (e.g., flicker events of one of the pixels 106a-106n), a block of pixel locations (e.g., flickering events of a group of the pixels 106a-106n that may be close to each other) and/or all of the pixel locations (e.g., flickering events that occur for all of the pixels 106a-106n). In an example, a distant light source (e.g., a lamp post in a background of an outdoor scene) that may be within the field of view of the lens 52 may generate flicker events that impact a local region of the pixels 106a-106n. In another example, a flickering light source illuminating the entire scene may generate flicker events on all of the pixels 106a-106n.

The flicker events may comprise a characteristic pattern. The characteristic pattern of the flicker events may be detected by the processor 104. In an example, the characteristic pattern may comprise the detection of contrast changes that may ramp up (or step up) over a brief time of the events 108a-108n as the flickering light source increases in intensity, until a peak light intensity is reached for the flicker (e.g., events that comprise an increasing light polarity). After the peak intensity is reached, the characteristic pattern may comprise the detection of contrast changes that may ramp down (or step down) over a brief time of the events 108a-108n as the flickering light sources decreases in intensity, until a minimum intensity is reached for the flicker (e.g., events that comprise a decreasing light polarity). For example, LED light sources and/or pulse-width modulated light sources may increase and/or decrease in intensity in discrete steps. The processor 104 may process the characteristic pattern for the increase and the decrease in independent loops (or threads) independently (e.g., each polarity may be processed independently). For example, one loop may track the flicker events as the increase of intensity (e.g., the ON events) and another loop may track the flicker events as the decrease in intensity (e.g., the OFF events). Each loop may search for periodic bursts of the events 108a-108n of the same polarity.

The tick results of the signal TICK may not be part of the events 108a-108n generated by the EB sensor 102. The tick results may comprise a series of timestamps. The series of timestamps of the tick results may correspond to predicted times that the processor 104 determines that the upcoming flicker events may occur at. For example, the tick results may predict upcoming bursts of the events 108a-108n that may result from the flickering light source. The processor 104 may be configured to estimate a time period (e.g., an in-period or a neighborhood) around the tick results. Any of the events 108a-108n that occur within the time period estimated around the tick results may be considered to have been generated by the flickering light source. In an example, the processor 104 may filter out the events 108a-108n that occur within the time period around the tick results. In another example, the processor 104 may use the tick results for further processing (e.g., to demodulate a visible light communication signal, extracting active markers, etc.).

In some embodiments, the processor 104 may be configured to perform the flicker detection. For example, another component implemented by the apparatus 100 may be configured to perform filtering in response to the signal TICK generated by the processor 104 (e.g., to be described in association with FIG. 5). In some embodiments, the processor 104 may be configured to perform flicker detection and the flicker mitigation.

Figure 4:
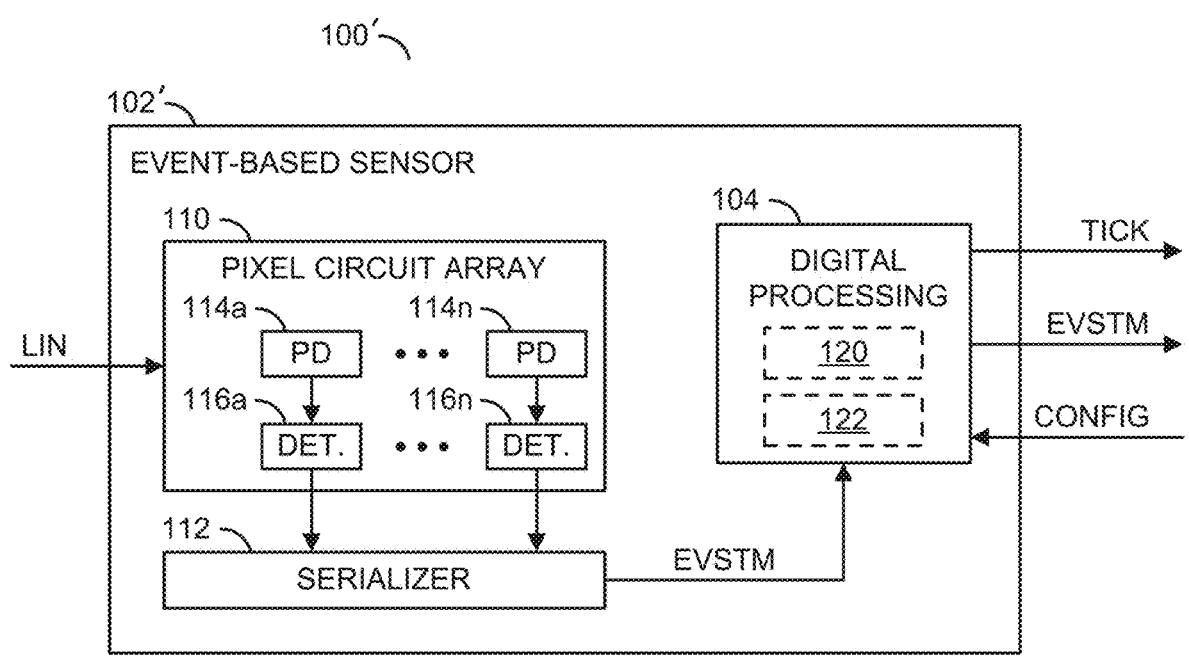
FIG. 4 is a block diagram illustrating a tick result generated by a digital processor implemented in an event-based sensor in response to an event stream.

Referring to FIG. 4, a block diagram illustrating a tick result generated by a digital processor implemented in an event-based sensor in response to an event stream is shown. A block diagram of the apparatus 100' is shown. The apparatus 100' is shown comprising the EB sensor 102'. In the example shown, the apparatus 100' may implement the EB sensor 102' and the digital processor 104 as a single component.

The EB sensor 102' may comprise the processor 104, the pixel circuit array 110 and/or the serializer 112. The pixel circuit array 110 comprising the photosensitive elements 114a-114n and the detector circuits 116a-116n and the serializer 112 may have a similar implementation as described in association with FIG. 3. For example, the pixel circuit array 110 may generate the events 108a-108n in response to the light input LIN and the serializer 112 may generate the event stream EVSTM comprising a series of the events 108a-108n. The processor 104 may generate the signal TICK and/or pass through the event stream EVSTM in response to the event stream EVSTM.

Generally, before the flickering, the EB sensor 102' may be configured to manage the bandwidth of the light input LIN. The bandwidth may be determined based on the amount of the events 108a-108n generated. A flickering light source in the light input LIN may cause frequent bursts of contrast changes, which may result in many of the events 108a-108n being generated. By filtering out the flicker events, the bandwidth of the event stream EVSTM may be reduced. Filtering out the flicker events in the event stream EVSTM may enable the processor 104 and/or other (e.g., downstream) components to receive data with fewer of the events 108a-108n (e.g., less noisy data).

In the example shown, the apparatus 100' may implement the processor 104 as a component of the EB sensor 102'. Since the flicker detection and/or flicker mitigation may be performed by the processor 104 within the EB sensor 102', the events 108a-108n that correspond to the flicker events may be removed before outputting the event stream EVSTM from the EB sensor 102'. In the example shown in association with FIG. 3 (e.g., the processor 104 implemented outside of the EB sensor 102), the event stream EVSTM including the flicker events may be output by the EB sensor 102 before being received by the processor 104. In an example, for static flickering light sources, regions of interest may be set for the pixels 106a-106n that may silence the flickering pixels in order to reduce the bandwidth and then occasionally reactivate the silenced pixels to determine if the flickering is still present.

Figure 5:
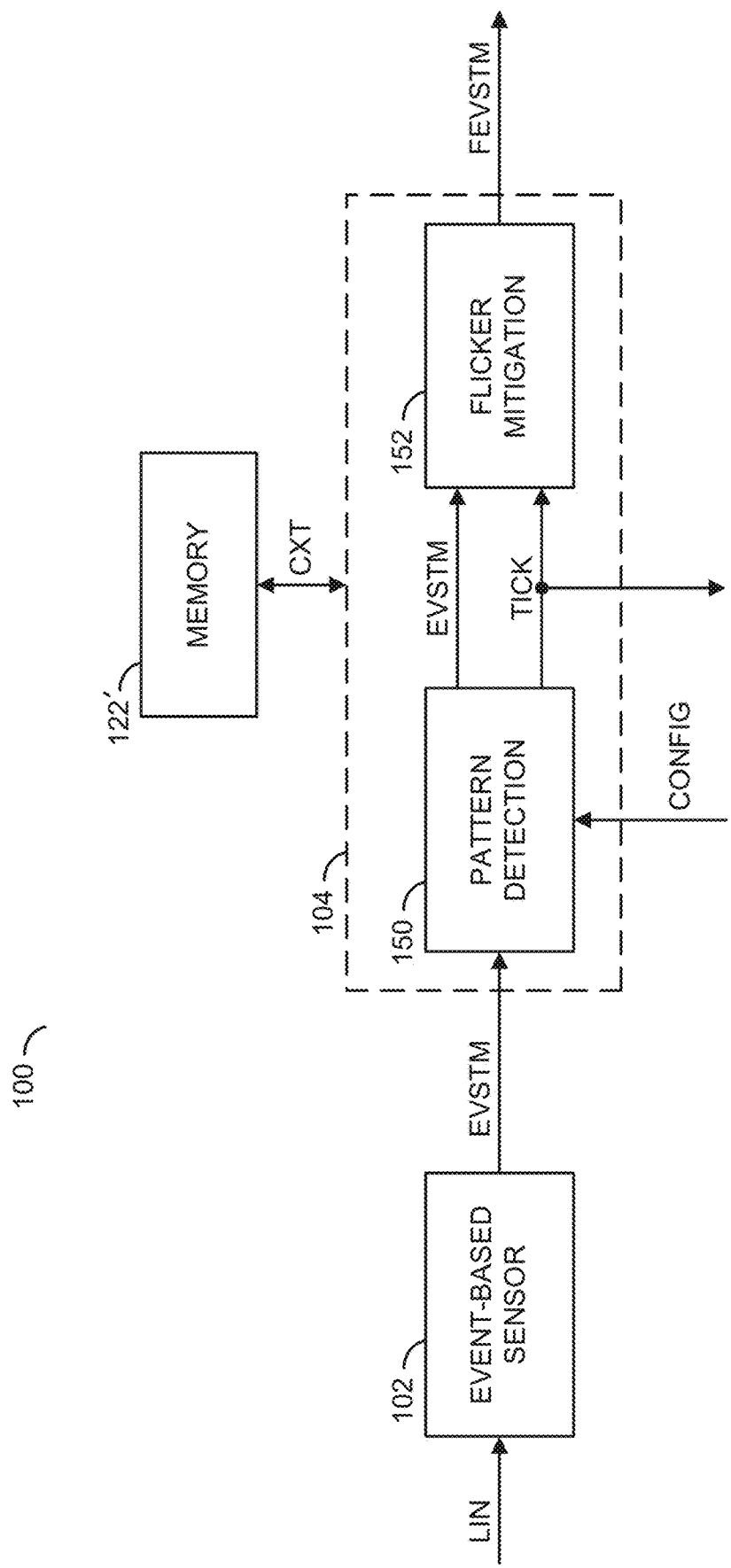
FIG. 5 is a block diagram illustrating flicker mitigation in response to an event stream and a tick result.

Referring to FIG. 5, a block diagram illustrating flicker mitigation in response to an event stream and a tick result is shown. The apparatus 100 is shown implementing flicker mitigation and flicker detection. In some embodiments, the flicker mitigation may be implemented by the computer readable instructions 120 implemented by the processor 104. In some embodiments, the flicker mitigation may be implemented as a part of an event processing pipeline (e.g., downstream from the processor 104). Generally, the flicker mitigation may be implemented as part of a digital processing pipeline.

The apparatus 100 is shown comprising the EB sensor 102, the processor 104 and/or the memory 122'. The processor 104 may comprise a block (or circuit) 150 and/or a block (or circuit) 152. The circuit 150 may implement a pattern detection module. The circuit 152 may implement a flicker mitigation module. In one example, the computer readable instructions 120 may be configured to execute the operations performed by the pattern detection module 150 and the flicker mitigation module 152. The apparatus 100 may comprise other components (not shown). In an example, the apparatus 100 may comprise the event processing pipeline that may comprise other components implemented before and/or after the flicker mitigation module 152.

In the example event processing pipeline shown, the EB sensor 102 may receive the light input LIN (e.g., the focused light received via the lens 52). The EB sensor 102 may present the event stream EVSTM to the processor 104. The pattern detection module 150 may generate the signal TICK in response to the event stream EVSTM. The pattern detection module 150 may pass through the event stream EVSTM. In some embodiments, the processor 104 may perform one or more post-processing operations on the event stream EVSTM and output a processed event stream. The event stream EVSTM and the tick result TICK may be presented to the flicker mitigation module 152. In some embodiments, the tick result TICK may be communicated to other components (not shown) for other analysis of the TICK results (e.g., gathering statistics).

The pattern detection module 150 may be configured to analyze the event stream EVSTM in order to detect a characteristic pattern of a flicker event. The pattern detection module 150 may be configured to output the signal TICK comprising the tick result in response to the characteristic pattern of the flicker event. The pattern detection module 150 may be configured to lock to the flicker pattern in response to determining a stability of the characteristic pattern in the event stream EVSTM. The pattern detection module 150 may be configured to validate the tick result based on the criteria defined by the tunable thresholds provided by the signal CONFIG.

The pattern detection module 150 may be configured to re-evaluate and/or correct the timestamp for the tick results. The pattern detection module 150 may be configured to validate a period of the tick results. The operations performed by the pattern detection module 150 may be configured to generate the tick result signal TICK and pass through the event stream EVSTM in response to the event stream EVSTM and/or the signal CONFIG.

The flicker mitigation module 152 may receive the signal TICK and the signal EVSTM (or a processed version of the event stream EVSTM). The flicker mitigation module 152 may generate a signal (e.g., FEVSTM) in response to the tick result TICK and the event stream EVSTM. The signal FEVSTM may comprise a filtered event stream.

The flicker mitigation module 152 may be configured to remove (e.g., filter out, drop, delete, etc.), one or more of the events 108a-108n from the event stream EVSTM based on the tick results TICK. The tick results TICK may comprise timestamps comprising a prediction of when flicker results may be captured (e.g., based on a period determined by the analysis of the characteristic pattern of the event stream EVSTM by the pattern detection module 150). The flicker mitigation module 152 may remove the events 108a-108n that occur at and/or near the timestamp of the tick results TICK. The filtered event stream FEVSTM may comprise fewer of the events 108a-108n than the number of the events 108a-108n in the event stream EVSTM.

Generally, the events 108a-108n that are filtered out may occur close to the predicted timestamp of the tick result TICK. In some embodiments, additional processing may be performed to determine whether some flickering events may be considered important/desirable (e.g., emergency lights). For example, a frequency and/or range of the events that correspond with the flickering light source may be analyzed and may be compared with known frequencies (e.g., the pre-defined flickering light frequency used by emergency services). Details of the detection of the tick results and the filtering of the events 108a-108n that correspond with the flicker event may be described in association with FIG. 6 and FIG. 7.

The memory 122' is shown as a component separate from the processor 104. The memory 122' may be configured to communicate a signal (e.g., CXT) with the processor 104. The signal CXT may be configured to provide context information for multiple instances of the pattern detection performed by the pattern detection module 150 and/or the flicker filtering performed by the flicker mitigation module 152. Implementing the memory 122' may enable multiple flicker sources to be tracked and/or filtered in the event stream EVSTM.

The processor 104 may be configured to perform flicker detection and/or mitigation for a full scene (e.g., the full FOV of the EB sensor 102) or for sub-regions of the scene captured by the EB sensor 102. The processor 104 may be configured to select between performing the flicker detection and/or mitigation for the full scene or for one or more sub-regions. In one example, the sub-region may comprise a block of multiple of the pixels 106a-106n (e.g., all the pixels 106a-106n that correspond to a bottom right of the EB sensor 102, all the pixels 106a-106n that correspond to a middle region of the EB sensor 102, all the pixels 106a-106n that correspond to a row of pixels of the EB sensor 102, etc.). In another example, the sub-region may comprise one or more of the individual pixels 106a-106n. The number of blocks and/or individual pixels that may be analyzed for flicker detection and/or mitigation may depend on a capacity of the memory 122' (e.g., the higher the number of instances of flicker detection and/or mitigation for the blocks/pixels, the more capacity may be used in the memory 122').

In some embodiments, the processor 104 may analyze the whole scene and lock to a global flicker frequency that may be detected in the scene captured by the EB sensor 102. For the whole scene analysis, a single context of the flicker detection and/or mitigation may be implemented. Each of the pixels 106a-106n may share the same variables. For the whole scene analysis, only one flicker source in the event stream EVSTM may be filtered. For the single context of the flicker detection and/or mitigation no per-pixel storage may be needed (e.g., the whole scene analysis may be performed even if the memory 122' is not implemented).

In some embodiments, the processor 104 may be perform multiple instances of the flicker detection and/or the flicker mitigation. Each instance of the flicker detection and/or the flicker mitigation may be performed per block of the pixels 106a-106n (or per individual pixels 106a-106n). Implementing multiple instances of the flicker detection and/or the flicker mitigation may provide an advantage of potentially filtering multiple flickering sources (e.g., one source per pixel or one source per block of pixels). The memory 122' may provide storage of the context per pixel or per block. The signal CXT may communicate the contexts per pixel or per block between the processor 104 and the memory 122'. For the per pixel or per block flicker detection and/or flicker mitigation the memory 122' may be needed to store the multiple contexts (e.g., a single context may not be sufficient).

Referring to FIG. 6, a diagram illustrating timing data for clusters of events in a flicker event is shown. A timing graph 200 is shown. The timing graph 200 may comprise an axis T. The axis T may represent time. The timing graph 200 may illustrate the events 108a-108n of the event stream EVSTM that occur over the time T.

A cluster of arrows 202a-202n, arrows 204a-204b and a cluster of arrows 206a-206n are shown extending from the axis T. The cluster of arrows 202a-202n, the arrows 204a-204b and the cluster of arrows 206a-206n may represent examples of the events 108a-108n that have the same polarity (e.g., contrast changes) that have occurred over time in the event stream EVSTM. The cluster of events 202a-202n may correspond to a cluster of contrast changes detected in response to a flickering light source. The two events 204a-204b may correspond to desired events captured by the EB sensor 102. The cluster of events 206a-206n may correspond to a subsequent cluster of contrast changes detected in response to a flickering light source.

The event 202c may correspond to a tick result that occurs at the time tn. The event 206c may correspond to a tick result that occurs at the time tn+1. In the example shown, the tick results may occur at the same time as the event 202c and the event 206c. However, the tick results may not necessarily occur at the same time as one of the events 108a-108n.

A line 210a is shown extending from the tick result 202c. A line 210b is shown extending from the axis T before the tick result 206c. A timespan TP is shown between the lines 210a-210b. The timespan TP may represent a predicted period for the tick results. A line 212 is shown extending from the tick result 206c. The line 212 may represent a time of the tick result 206c. A correction time A is shown from the end of the timespan TP and the time 212 of the tick result 206c.

Lines 220a-220b are shown extending around the cluster of events 202a-202n. The lines 220a-220b may represent a neighborhood (or an in-period) for the tick result 202c. A region 222 is shown between the line 220b and a line 224a. Lines 224a-224b are shown extending around the cluster of events 226a-226b. The lines 224a-224b may represent a neighborhood (or an in-period) for the tick result 206c. The neighborhood 220a-220b and/or the neighborhood 224a-224b may comprise sections of time that comprise a cluster of the contrast changes (e.g., the events 108a-108n). The region 222 may comprise a silence period SP (e.g., an out period) between the flicker events.

The processor 104 may be configured to generate the tick results. The tick results may comprise one or more moments in time. The tick results may be represented by a timestamp. The timestamp of the tick results may correspond to a sufficiently precise time base. The processor 104 may calculate the tick results to fall in a center (or middle time) of a cluster of the events 108a-108n (ON events or OFF events) that were generated in response to a flickering light source. In the example shown, the tick result 202c may be generated at the center of the cluster of events 202a-202n.

In the example shown, the tick result 202c may occur at the time tn. The processor 104 may predict the next tick result 206c according to the flickering period TP. For example, the next tick result 206c may occur at the time tn+1=tn+TP. In order to determine the next tick result based on the period TP, the processor 104 may first determine the flickering period TP and determine the initial time tn of the tick results.

The processor 104 may be configured to perform a tick correction. For example, the estimated (or predicted) upcoming timestamps of the tick results may not necessarily be precise for each of the tick results. In an example, during a startup phase or a synchronization phase, the estimate may not yet be calibrated. In another example, the tick results may miss a cluster of the events 108a-108n that corresponds to a flicker. In yet another example, the cluster of events 108a-108n that correspond to a flicker may exhibit a time drift. The tick correction performed by the processor 104 may be configured to re-evaluate the timestamp of each of the tick results.

The processor 104 may re-evaluate the timestamp of the tick results by calculating an average timestamp of all of the events within a tick neighborhood (e.g., in events). For example, the cluster of events 202a-202n (each having a timestamp ts) may comprise the in events in the neighborhood 220a-220n. In one example, the average timestamp may be calculated according to an equation EQ1.

$$\Delta = \frac{1}{N} \sum_{ts \in tn \pm \delta T} (ts - tn) \quad \text{EQ1}$$

The equation EQ1 may be one example calculation for the average timestamp using a sample average. Other averaging calculations may be performed.

The tick correction calculation by the processor 104 may comprise a correction term based on the average timestamp offset with respect to the tick result of all of the cluster of events 202a-202n that were captured within a vicinity of the tick result 202c. The neighborhood (or vicinity) of the tick result may be determined based on a tunable parameter $\delta T$. In the example shown, the neighborhood 220a-220b may comprise a timespan from tn−$\delta T$ (e.g., the line 220a) to tn+$\delta T$ (e.g., the line 220b). In some embodiments, a gain $\beta$ may be applied to the correction term. The gain may enable smoothing of a convergence to the tick result.

In an example, when the tick result misses a center of a cluster of the events 108a-108n, but the cluster is still within the vicinity $\delta T$ of the tick result, then the calculated correction term may provide a true center position of cluster of the events 108a-108n. In the example shown, the time period TP from the time 210a of the tick result 202c may miss the time 212 of the tick result 206c. The processor 104 may apply the correction term $\Delta$. For example, the next tick result may occur at tn+1=tn+TP+$\beta\Delta$.

The processor 104 may be configured to perform tick validation. After a tick date (e.g., the timestamp of the tick result) is calculated, the processor 104 may validate the tick result by determining whether the tick result 206c actually represents the cluster of events 206a-206n. The tick results may be validated according to a criteria. In one example, the tick criteria may comprise three criterions (e.g., number of cluster events, event deviation and silence depth). In some embodiments, additional criterion may be used to validate the tick results. In some embodiments, a subset of the three criterions may be used to validate the tick results.

The criteria used to validate the tick results may be tunable thresholds. In an example, the tunable thresholds for the criteria may be adjusted using the input signal CONFIG. The thresholds selected may have an impact on a convergence of the flicker detection. Which values are used for the various criteria may depend on various factors (e.g., the scene, flicker source intensity, sensor sensitivity, sensor resolution, etc.). The various criteria may be compared to statistics in the characteristic pattern of the event stream EVSTM that may be analyzed by the pattern detection module 150.

Generally, a single set of threshold settings for the various criteria may be used for a variety of flickering scenes. In an example, the signal CONFIG may be received to set the thresholds for the various criteria and the tick validation may be performed for various scenes without reconfiguration for each new scene. The criteria used to validate the tick results may be varied according to the design criteria of a particular implementation.

One of the criteria for tick validation may comprise a number of cluster events. The number of cluster events criterion may be used to determine whether a sufficient number (e.g., an event number threshold) of the events 108a-108n have been captured in the tick neighborhood 224a-224b. In an example, the processor 104 may determine statistics about whether the number of events with a timestamp $ts \in tn \pm \delta T$ is greater than the event number threshold.

One of the criteria for tick validation may comprise an event deviation. The event deviation criterion may comprise determining whether the cluster of events 206a-206n occurs close enough together (e.g., clustered enough around a deviation from a mean). The mean value may be the $\Delta$ variable. The event deviation criterion may be satisfied if the deviation (e.g., $std\{ts-tn\}$) from the mean is less than a deviation threshold. Generally, the standard deviation may be approximately comparable to the mean timespan of events generated by the pixels 106a-106n on contrast change.

One of the criteria for tick validation may comprise a silence depth. The processor 104 may determine whether there is a pronounced silence period SP (e.g., of low event activity and/or with relatively few of the contrast changes with the same polarity) between the previous tick result and the current tick result. The silence depth may be determined based on a ratio. The ratio may be determined according to the statistics of an observed event count out of the neighborhood to the observed event count within the neighborhood (e.g., Nout/Nin). In the example shown, the ratio may be the number of the events 204a-204b in the period SP to the number of the events 108a-108n in the cluster of events 206a-206n in the neighborhood 224a-224b. The processor 104 may determine whether the silence depth ratio is less than a silence depth threshold. In particular, the silence depth criterion may prevent the processor 104 from loop locking to a divisor of the true flicker frequency.

The processor 104 may be configured to perform period estimation for the tick results. If the processor 104 determines that the previous tick result (e.g., tn−1) and the current tick result (e.g., tn+1) are valid, then the flicker period may be estimated. The flicker period may be estimated as the difference between corrected timestamps. In an example, the flicker period may be calculated according to: $TP_{n+1} = t_{n+1} + \Delta_{n+1} - t_n$.

The processor 104 may determine an initial period (e.g., a startup period). For example, since the initial flickering period may not be known at startup, the processor 104 may start from some initial period value as an approximation. The startup period may be a synchronization period Tsync. The value of Tsync may be selected to be large enough to capture at least one instance of the clusters of the events 108a-108n that corresponds to the flickering light source. The value of Tsync may also be selected to be small enough to capture only one cluster of the events 108a-108n that corresponds to a flickering light source. For example, selecting more than one cluster may cause the correction value calculated for the tick correction to provide a meaningless result.

In some embodiments, the value for the synchronization period Tsync may be a minimum possible flickering period (e.g., a value that corresponds to a highest expected flicker frequency). Generally, the selection of the initial tick position may be arbitrary (e.g., a first event captured). Other initial values may be selected according to the design criteria of a particular implementation.

The processor 104 may be configured to implement period validation. The period validation may comprise an additional range check that may be performed on the estimated period. For example, the processor 104 may verify whether the estimated period is in an expected range of [Tmin,Tmax] of possible flicker source periods. If the processor 104 determines that the estimated period is valid, then the estimated period may be used to determine the timestamp of the next tick result. If the period is determined not to be valid, then the processor 104 may use Tsync as the period to determine the timestamp of the next tick result.

The processor 104 may be configured to lock to the flicker events. The processor 104 may initiate the flicker detection in the synchronization state. In response to analyzing the characteristic pattern of the flicker events (e.g., determining a stable flickering pattern), the processor 104 may enter a locked state. In one example, switching between the sync state and the locked state may be determined according to a counter with hysteresis. For example, a lock (e.g., hysteresis) counter may be implemented by the pattern detection module 150. In some embodiments, the hysteresis counter may be incremented in response to detecting a valid period and decremented when no valid period is detected.

A locked threshold may be implemented. The locked threshold may be a tunable value. If the hysteresis counter is above the locked threshold, then the processor 104 may switch the flicker detection to the locked state. In another example, the hysteresis counter may be compared to an upper threshold for entering the locked state and a different lower threshold for exiting the locked state. In some embodiments, the counter may be implemented without hysteresis. Other techniques for determining whether the burst of the events 108a-108n for the flicker event are repetitive (e.g., periodical) enough may be used to enter the locked state. The criteria for entering the locked state may be varied according to the design criteria of a particular implementation.

When the processor 104 determines that the flicker detection is the sync state, the tick result period TP may be the value Tsync. When the processor 104 determines that the flicker detection is in the locked state, the tick result period TP may be the last valid period. In some embodiments, a different neighborhood interval $\delta T$ (e.g., a flicker neighborhood interval δTF) may be used for the sync state and for the locked state. For example, a narrower neighborhood interval used in the locked state may enable fewer of the events 108a-108n to be dropped when the position of the cluster of events 206a-206n is confirmed. In the sync state a wider interval may be used due to the arbitrary starting point for the tick date.

The processor 104 may determine to enter the locked state in response to analyzing the characteristic pattern of the flicker events. For example, the processor 104 may determine the flicker events have been stably detected when the flicker pattern has been detected for a predetermined period of time (e.g., a sufficiently long period of time). In one example, a time interval may be measured between each burst of contrast changes detected. If the intervals measured are determined to be close enough to the expected flicker period (or range of expected flicker periods), then the bursts may be determined to be periodical and may correspond to a flicker event. If a sufficient number of the flicker periods are detected, then the flicker detection may enter the locked state (e.g., flicker mitigation may be performed).

Referring to FIG. 7, a diagram illustrating flicker mitigation of clusters of events that occur within a neighborhood of a tick event is shown. A timing graph 250 is shown. The timing graph 250 may illustrate comprise an axis T. The axis T may represent time. The timing graph 250 may illustrate the events 108a-108n of the event stream EVSTM that occur over the time T.

A tick result 252a and a tick result 252b are shown. The tick result 252a may be within a filter neighborhood 260a-260b. The tick result 252b may be within a filter neighborhood 262a-262b. A cluster of arrows 254a-254n are shown within the filter neighborhood 260a-260b. The cluster of arrows 254a-254n may comprise a cluster of events corresponding to a flicker event, similar to the cluster of arrows 202a-202n shown in association with FIG. 6. Arrows 256a-256m are shown within the silence region 222. The arrows 256a-256m may comprise events that do not correspond to a flicker event similar to the events 204a-204b shown in association with FIG. 6. The cluster of arrows 258a-258n may comprise a cluster of events corresponding to a flicker event within the flicker neighborhood 262a-262b, similar to the cluster of arrows 206a-206n shown in association with FIG. 6.

The timing graph 250 may represent a timing of the events 108a-108n captured while the processor 104 has entered the locked state. For example, the processor 104 may have analyzed the characteristic pattern of the flickering events and determined that the stable pattern (e.g., flicker events occurring repeatedly over a period of time) has been detected. Prior to suppressing bursts of the events 108a-108n (e.g., flicker mitigation), the processor 104 may ensure that the events 108a-108n to be filtered out form a periodical pattern. Performing the flicker mitigation while the processor 104 is in the locked state may ensure that the events 108a-108n that correspond to the flickering pattern are filtered, instead of filtering random bursts (e.g., due to noise at the output of the pixels 106a-106n). A stable flickering pixel may generate bursts of events of different polarities at expected periods of time (e.g., 10 ms period for 100 Hz flicker).

When the processor 104 is in the locked state, the flicker mitigation module 152 may perform filtering within the flicker neighborhoods of the tick results (e.g., the flicker neighborhood 260a-260b for the tick result 252a and the flicker neighborhood 262a-262b for the tick result 252b). The filtering may be performed for a single pixel, a group of pixels or the entire field of view. The flicker mitigation module 152 may be configured to remove all of the events 108a-108n that occur within the flicker neighborhoods (e.g., all events within [ts−δTF . . . ts+δTF]). The vicinity δTF of the flicker neighborhood may be a tunable parameter (e.g., tunable by the signal CONFIG). In one example, the vicinity δTF may be a static parameter. In another example, the vicinity δTF may be a dynamically adjusted parameter.

Generally, the vicinity δTF for filtering may be different than the value used to validate the tick results. For example, since the processor 104 is operating in the lock state, the vicinity for δTF may be narrower than the vicinity δT used for the neighborhood of the tick result (e.g., used for tick correction and/or tick validation). In the example shown, the flicker neighborhood 260a-260b may be narrower around the tick result 252a than the neighborhood 220a-220b around the tick result 202c shown in association with FIG. 6. Similarly, the flicker neighborhood 262a-262b may be narrower around the tick result 252b than the neighborhood 224a-224b around the tick result 206c shown in association with FIG. 6. The vicinity δTF may be varied according to the design criteria of a particular implementation.

In some embodiments, the flicker mitigation module 152 may dynamically estimate the width of the cluster of events for filtering. In one example, dynamic estimation may be performed by scaling the deviation of event timestamps (e.g., the IN timestamps) around the tick results. For example, the vicinity for filtering may be $δTF=ασ$, where a is a fixed tunable parameter that enables control over an amount of cluster events to be filtered, and a is an estimate of standard deviation of the events near the tick result. The technique for selecting the value of δTF may be varied according to the design criteria of a particular implementation.

Since all events within the filtering vicinity 260a-260b may be filtered out, some of the events 108a-108n that are unrelated to the flickering event may also be filtered out. In the example shown, all the cluster of events 254a-254n in the vicinity of the tick result 252a may be filtered out and all of the cluster of events 258a-258n in the vicinity of the tick result 252b may be filtered out. All of the events 256a-256m in the silence region 222 may remain in the filtered event stream FEVSTM. Keeping the events 256a-256m in the silence region 222 may provide desired events in the filtered event stream FEVSTM rather than removing all events from one of the pixels 106a-106n that is determined to be capturing flickering light input. By limiting the vicinity δTF for the lock state, fewer of the events 108a-108n may be filtered out.

Figure 8:
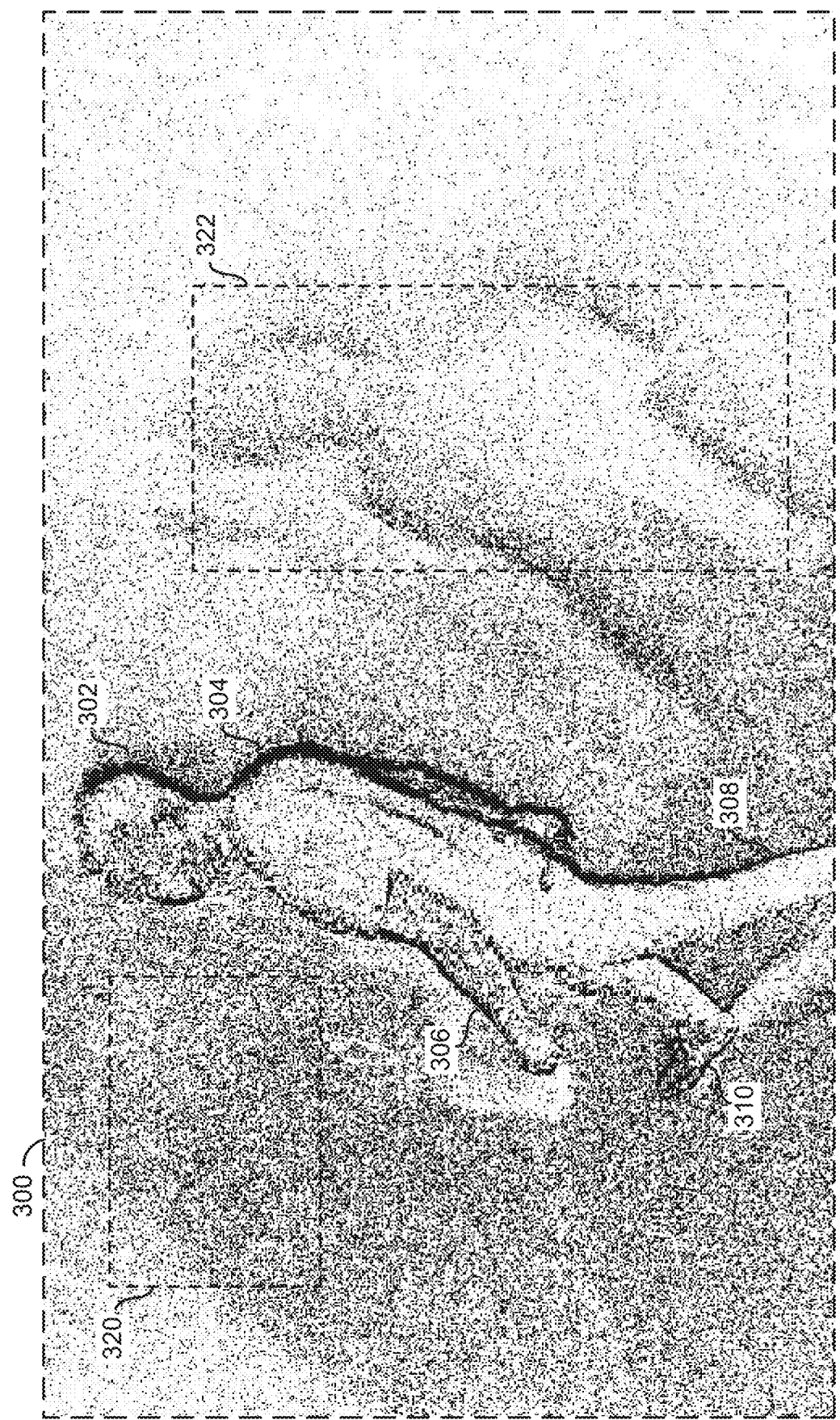
FIG. 8 is a diagram illustrating a visual representation of an event stream without flicker mitigation.

Referring to FIG. 8, a diagram illustrating a visual representation of an event stream without flicker mitigation is shown. A visual representation 300 of the event stream EVSTM is shown. The visual representation 300 of the event stream EVSTM may represent a snapshot of the events 108a-108n generated by the pixels 106a-106n at a moment in time. The visual representation 300 of the event stream EVSTM may be provided as a single snapshot for illustrative purposes. Generally, the event stream EVSTM may be asynchronously updated as each of the pixels 106a-106n outputs a new one of the events 108a-108n (e.g., as opposed to a conventional video frame that provides an entire output of an image sensor at the pre-defined framerate). While the event stream EVSTM may not provide individual frames, the visual representations of the event stream may be continually updated to provide an effective frame rate of approximately 10,000 frames per second (or more). The visual representation 300 of the event stream EVSTM may comprise a renderer representation, or a raster plot of the events 108a-108n of a full scene captured by the EB sensor 102.

The visual representation 300 of the event stream EVSTM may illustrate the output signal EVSTM without the flicker mitigation. For example, in the visual representation 300 of the event stream EVSTM, none of the events 108a-108n have been filtered. The processor 104 (e.g., the pattern detection module 150) may be configured to analyze the events 108a-108n to detect one or more characteristic patterns of flicker events. The number of flicker events detected may depend on whether the memory 122 enables more than one context to be stored (e.g., perform flicker detection for one flickering light source for the entire EB sensor 102 or perform flicker detection for multiple flickering light sources at various blocks/pixels of the EB sensor 102).

The visual representation 300 of the event stream EVSTM may provide an example of capturing a person walking in flickering light using the EB sensor 102. Clusters of events 302-310 are shown that represent changes in the light captured by the EB sensor 102 that correspond to the person walking. A cluster of events 302 may generally define a head of the person. A cluster of events 304 may generally define a body of the person. A cluster of events 306 may generally define an arm of the person. A cluster of events 308 may generally define a leg of the person. A cluster of events 310 may generally define the foot of the person. While the clusters of events 302-310 may capture the movement of the person, the visual representation 300 of the event stream EVSTM may comprise multiple other events (e.g., the black dots in the visual representation 300 may represent the pixels 106a-106n that have generated an output in response to the change in light, while white space may represent the pixels 106a-106n that have not generated an output). Some of the events 108a-108n may be desirable events while some of the events 108a-108n may correspond to flickering light sources.

A dotted box 320 and a dotted box 322 are shown. The dotted box 320 and the dotted box 322 may each comprise a cluster of the events 108a-108n. The cluster of events 320 may not correspond to the person in the visual representation 300 of the event stream EVSTM. The cluster of events 322 may correspond to a shadow cast by the person in the visual representation of the event stream EVSTM. The cluster of events 320 and/or the cluster of events 322 may each comprise a halo effect and/or a pulsing effect that may be caused by a flickering light source. In the example visual representation 300, most of the events may correspond to one or more flickering light sources.

The processor 104 may be configured to analyze the characteristic pattern of the various events in the event stream EVSTM. The processor 104 may not necessarily determine the type of object (e.g., a person, a vehicle, a shadow, etc.) that the events 108a-108n correspond to. The processor 104 may determine whether the characteristic pattern represents a flickering light source. After determining a lock (e.g., a stable flickering pattern), the processor 104 may mitigate the effects of the flickering light source by filtering out the events based on the calculated tick results. In an example, the movement of the person (e.g., the cluster of events 302-310) may not correspond to any flickering events. However, some of the events in the cluster of events 302-310 may still be caused by the flickering light sources and may be filtered out. In another example, a shadow of the person may not necessarily be an undesired object captured by the EB sensor 102. For example, the cluster of events 322 may not be filtered out if the shadow cast by the person is not caused due to a flickering light source. However, the events in the cluster of events 322 that are caused by a flickering light source may be filtered out. Generally, for illustrative purposes, most of the events in the cluster of events 320 and 322 may be caused by flickering light sources. Whether an event is filtered out may depend on the analysis of the characteristic pattern of the events and/or the tick results generated.

In an example, the cluster of events 320 may correspond to the pixels 106a-106n that have captured a 100 Hz flickering LED. The processor 104 may analyze the characteristic pattern of the 100 Hz flickering LED to determine whether there are periodical event patterns generated by a flicker. The processor 104 may estimate the tick results (e.g., generally at the center of a group of events caused by the 100 Hz flickering LED in the cluster of events 320).

In an example, the cluster of events 322 may correspond to the pixels 106a-106n that have captured the shadow cast by the person. While a majority of the events in the cluster of events 322 may be caused by a flickering light source, which may be filtered out, the cluster of events 322 may also comprise non-flicker events, which may be preserved (e.g., based on the analysis performed by the processor 104 not detecting a characteristic pattern that corresponds to a flickering light source).

Figure 9:
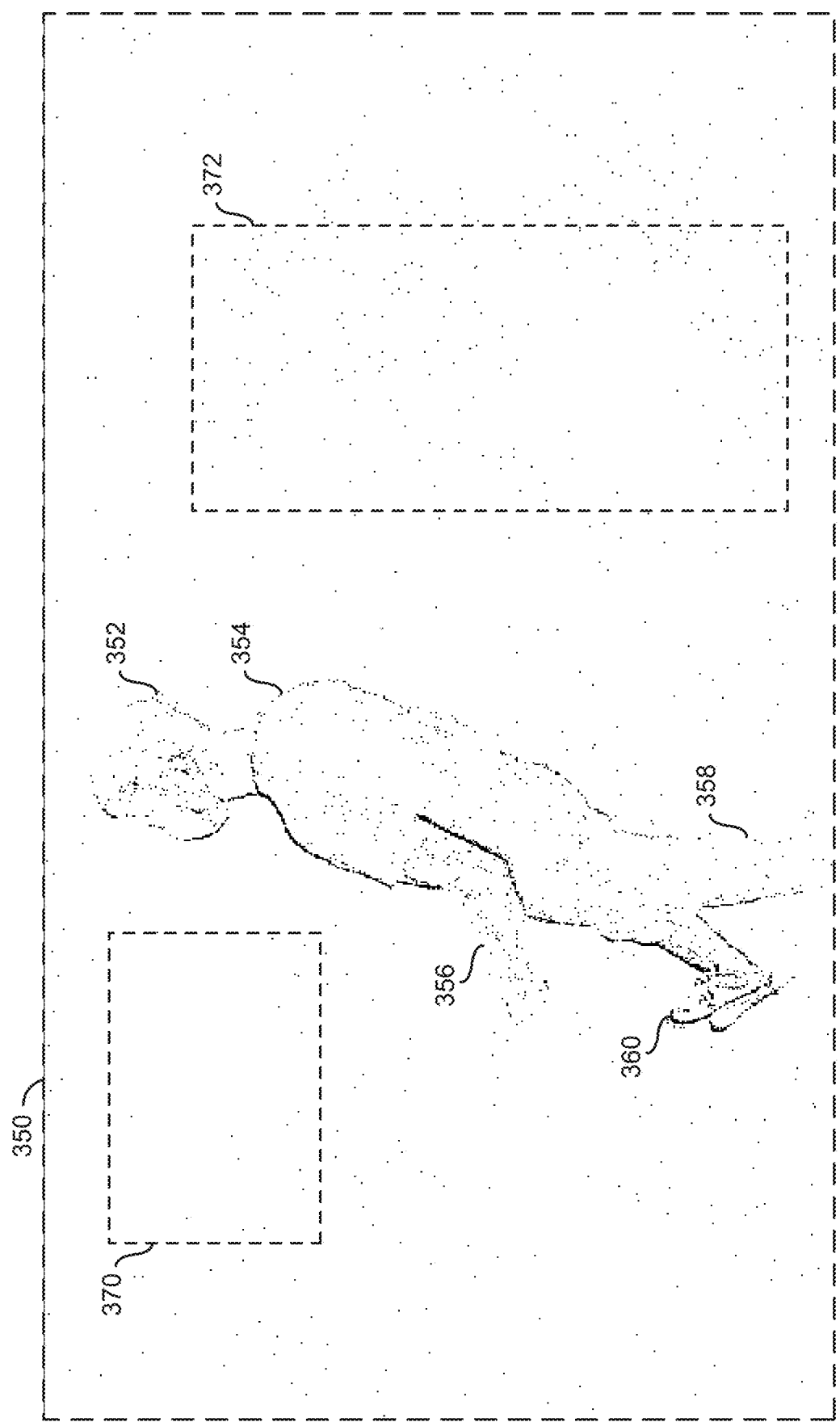
FIG. 9 is a diagram illustrating a visual representation of an event stream with flicker mitigation.

Referring to FIG. 9, a diagram illustrating a visual representation of an event stream with flicker mitigation is shown. A visual representation 350 of the filtered event stream FEVSTM is shown. Similar to the visual representation 300 shown in association with FIG. 8, the visual representation 350 of the filtered event stream FEVSTM may represent a snapshot of the events 108a-108n generated by the pixels 106a-106n at a moment in time. For example, the moment in time shown in the visual representation 350 of the filtered event stream FEVSTM may be a time later than the moment in time on the visual representation 300 (e.g., after the flicker detection had detected the flickering light sources and performed the flicker mitigation).

The visual representation 350 of the filtered event stream FEVSTM may illustrate the output signal FEVSTM generated due to the flicker mitigation performed by the flicker mitigation module 152. For example, in the visual representation 350 of the filtered event stream FEVSTM, the events 108a-108n that correspond to particular blocks/pixels that captured the flickering lights sources may have been filtered out.

Similar to the visual representation 300 of the event stream EVSTM shown in association with FIG. 8, the visual representation 350 of the filtered event stream FEVSTM may provide an example of capturing a person walking in flickering light using the EB sensor 102. Clusters of events 352-360 are shown that represent changes in the light captured by the EB sensor 102 that correspond to the person walking. A cluster of events 352 may generally define a head of the person. A cluster of events 354 may generally define a body of the person. A cluster of events 356 may generally define an arm of the person. A cluster of events 358 may generally define a leg of the person. A cluster of events 360 may generally define the foot of the person.

The clusters of events 352-360 corresponding to the person may have been pre-processed with flicker filter implemented by the flicker mitigation module 152. In the example shown, the clusters of events 352-360 in the visual representation 350 of the filtered event stream FEVSTM may be less dense than the clusters of events 302-310 in the visual representation 300 of the event stream EVSTM. For example, many of the original clusters of events 302-310 may have been caused by flickering light sources. While the filtering may drop many of the events 108a-108n that correspond to the person, the clusters of events 352-360 in the visual representation 350 of the filtered event stream FEVSTM may still preserve the contours of the person (e.g., the shape of the head 352, the shape of the body 354, the shape of the arm 356, the shape of the leg 358 and the shape of the foot 360 may still be clearly defined). The filtering performed by the flicker mitigation module 152 may enable various objects to still be defined by reducing an amount of data in the filtered event stream FEVSTM. Less data in the filtered event stream FEVSTM may prevent bandwidth flooding caused by too many of the events 108a-108n being generated because of the flickering light sources.

A dotted box 370 and a dotted box 372 are shown. The dotted box 370 and the dotted box 372 may each comprise a cluster of the events 108a-108n at a similar location in the visual representation 350 of the filtered event stream FEVSTM as the cluster of events 320-322 shown in the visual representation 300 of the event stream EVSTM shown in association with FIG. 8. The number of events (e.g., black dots) in the clusters of events 370-372 may be less dense. The filtering implemented may remove the halo effect caused by one or more flickering light sources. In an example, if most of the events 108a-108n are caused by flickering light sources, then the processor 104 may remove most of the events before generating the filtered event stream FEVSTM. While the clusters of events 370-372 are shown as representative examples of regions of the pixels 106a-106n that may be filtered out, the events 108a-108n that are filtered out may depend on the analysis by the pattern detection module 150.

In the example shown, the cluster of events 372 that corresponds to the shadow cast by the person may have been mostly filtered out. Shadows may not always be filtered out. Whether events (e.g., whether corresponding to a shadow, an object, etc.) are removed may be determined by whether the events 108a-108n are determined to be noise created by a flickering light source. The pattern detection module 150 and the flicker mitigation module 152 may be configured to remove noise created by the flickering light sources while simultaneously preserving events that were not caused by a flickering light source. In the example shown, many of the events 108a-108n in the clusters of events 370-372 may be filtered out while the counters of the walking person may be preserved.

The processor 104 may analyze the event stream EVSTM. After initial convergence (e.g., detection of the events that correspond to flickering light sources and the generation of the tick results), almost all of the flicker events may be filtered out of the filtered event stream FEVSTM. In some embodiments, regions that correspond to weakly flickering source may be less filtered.

The visual representation 350 of the filtered event stream FEVSTM may illustrate that many flickering light sources have been filtered out. In some embodiments, the event rate may be used to determine whether the filtering of the events 108a-108n has been performed (e.g., a comparison of a scene when the light source is flickering at 0 Hz compared to the event rate when the light source is flickering at the normal rate). For example, if the event rate is unchanged, then the flicker mitigation may have been applied. In some embodiments, the running the flicker mitigation again may determine whether the flicker mitigation was successful. For example, presenting the filtered event stream FEVSTM to the pattern detection module 150 may result in a failure to lock since any periodic flickering light may have already been filtered out.

Figure 10:
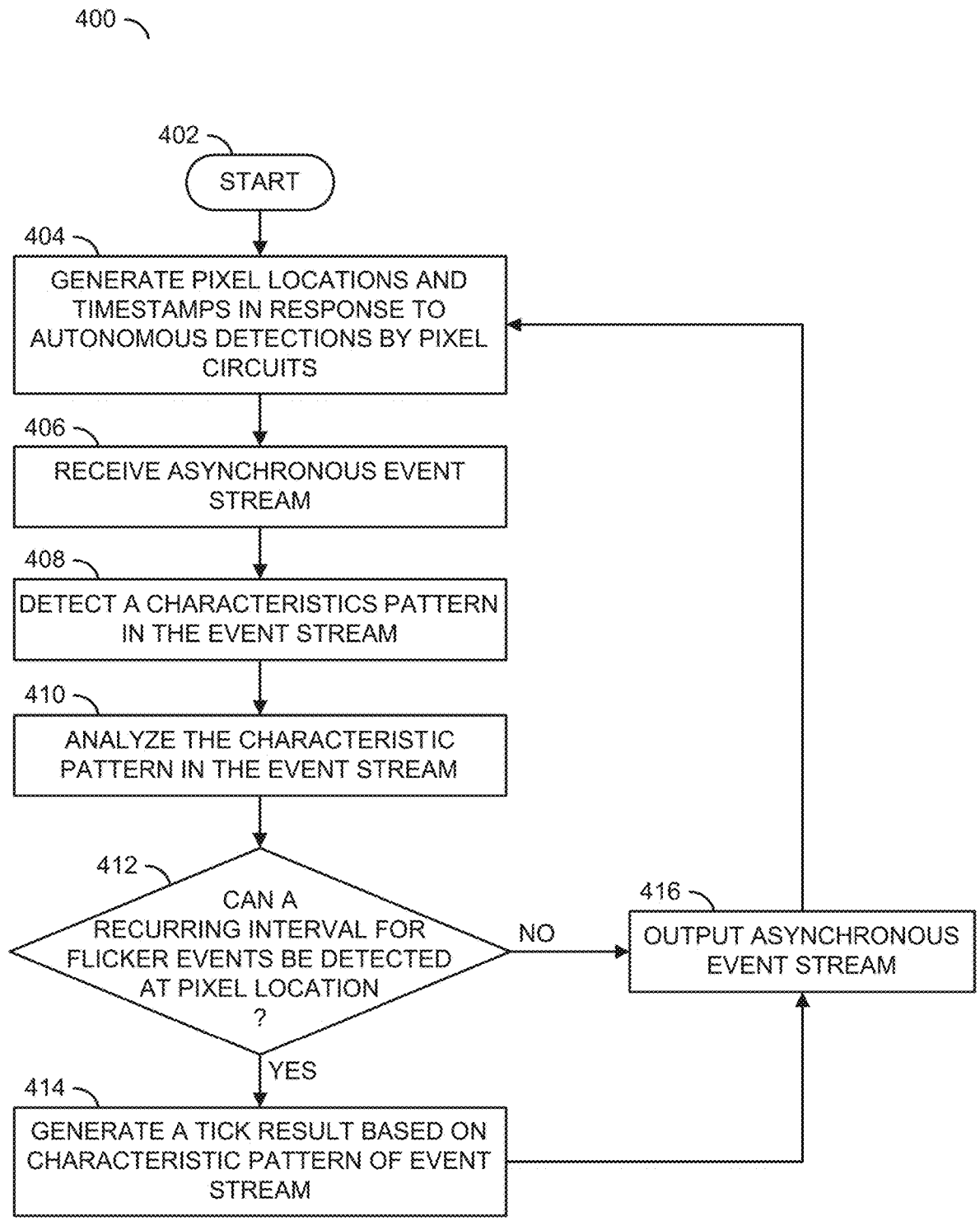
FIG. 10 is a flow diagram illustrating a method for anti-flicker filter mitigation for an event-based sensor.

Referring to FIG. 10, a method (or process) 400 is shown. The method 400 may implement anti-flicker filter mitigation for an event-based sensor. The method 400 generally comprises a step (or state) 402, a step (or state) 404, a step (or state) 406, a step (or state) 408, a step (or state) 410, a decision step (or state) 412, a step (or state) 414, and a step (or state) 416.

The step 402 may start the method 400. In the step 404, the EB sensor 102 may generate pixel locations and/or timestamps for the events 108a-108n in response to the autonomous detections made by the pixels 106a-106n of the pixel circuit array 110. The serializer 112 may receive the events 108a-108n from the detector circuits 116a-116n and insert the events 108a-108n into the event stream EVSTM in order of reception. Next, in the step 406, the processor 104 may receive the asynchronous event stream EVSTM. For example, the serializer 112 may continually present the event stream EVSTM as new events are detected by the pixels 106a-106n. Next, the method 400 may move to the step 408.

In the step 408, the processor 104 may detect a characteristic pattern in the event stream EVSTM. In an example, the pattern detection module 150 may operate using a startup period (e.g., the synchronization period Tsync). Next, in the step 410, the processor 104 may analyze the characteristic pattern of the event stream EVSTM. In an example, the pattern detection module 150 may determine whether a stable flicker pattern is detected to enter a lock mode of operation. Next, the method 400 may move to the decision step 412.

In the decision step 412, the processor 104 may determine whether a recurring interval for the flicker events can be detected at a pixel location. In some embodiments, the flicker events may be detected for the full scene (e.g., only one flicker source detected). In some embodiments, the flicker events may be detected on a per block/pixel basis. In an example, the pattern detection module 150 may implement a counter to determine whether a number of valid periods detected is above a threshold value. If no recurring interval for a flicker event is detected, then the method 400 may move to the step 416. If a recurring interval for a flicker event is detected, then the method 400 may move to the step 414. In the step 414, the processor 104 may generate a tick result based on the characteristic pattern of the event stream EVSTM. In an example, the pattern detection module 150 may generate the tick result TICK. Next, the method 400 may move to the step 416.

In the step 416, the pattern detection module 150 may output the asynchronous event stream EVSTM. In one example, the event stream EVSTM may be presented to the flicker mitigation module 152 with the tick result TICK in order for the flicker filtering to be performed. In another example, if no tick results are generated, the event stream EVSTM may be passed through without filtering. Next, the method 400 may return to the step 404. While the method 400 is shown sequentially, generally, the EB sensor 102 may continually and/or continuously generate the events 108a-108n while the processor 104 detects and analyzes the characteristic pattern of the event stream EVSTM, detects flicker events and/or generates the tick results.

Figure 11:
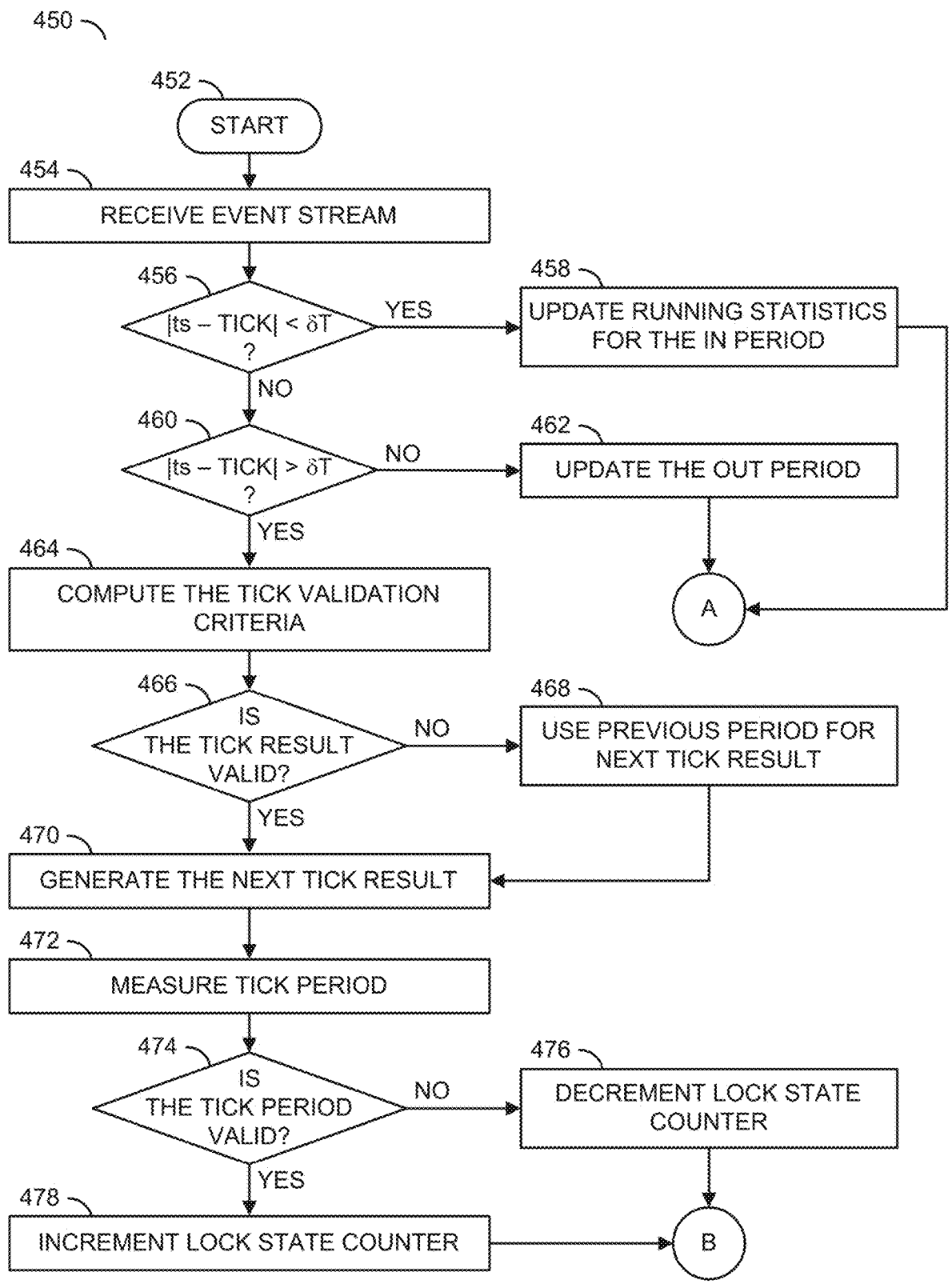
FIG. 11 is a flow diagram illustrating a method for analyzing an event stream to determine tick results and filter flicker events.

Referring to FIG. 11, a method (or process) 450 is shown. The method 450 may analyze an event stream to determine tick results and filter flicker events. A portion of the method 450 shown in FIG. 11 may generally comprise a step (or state) 452, a step (or state) 454, a decision step (or state) 456, a step (or state) 458, a decision step (or state) 460, a step (or state) 462, a step (or state) 464, a decision step (or state) 466, a step (or state) 468, a step (or state) 470, a step (or state) 472, a decision step (or state) 474, a step (or state) 476, and a step (or state) 478.

Figure 12:
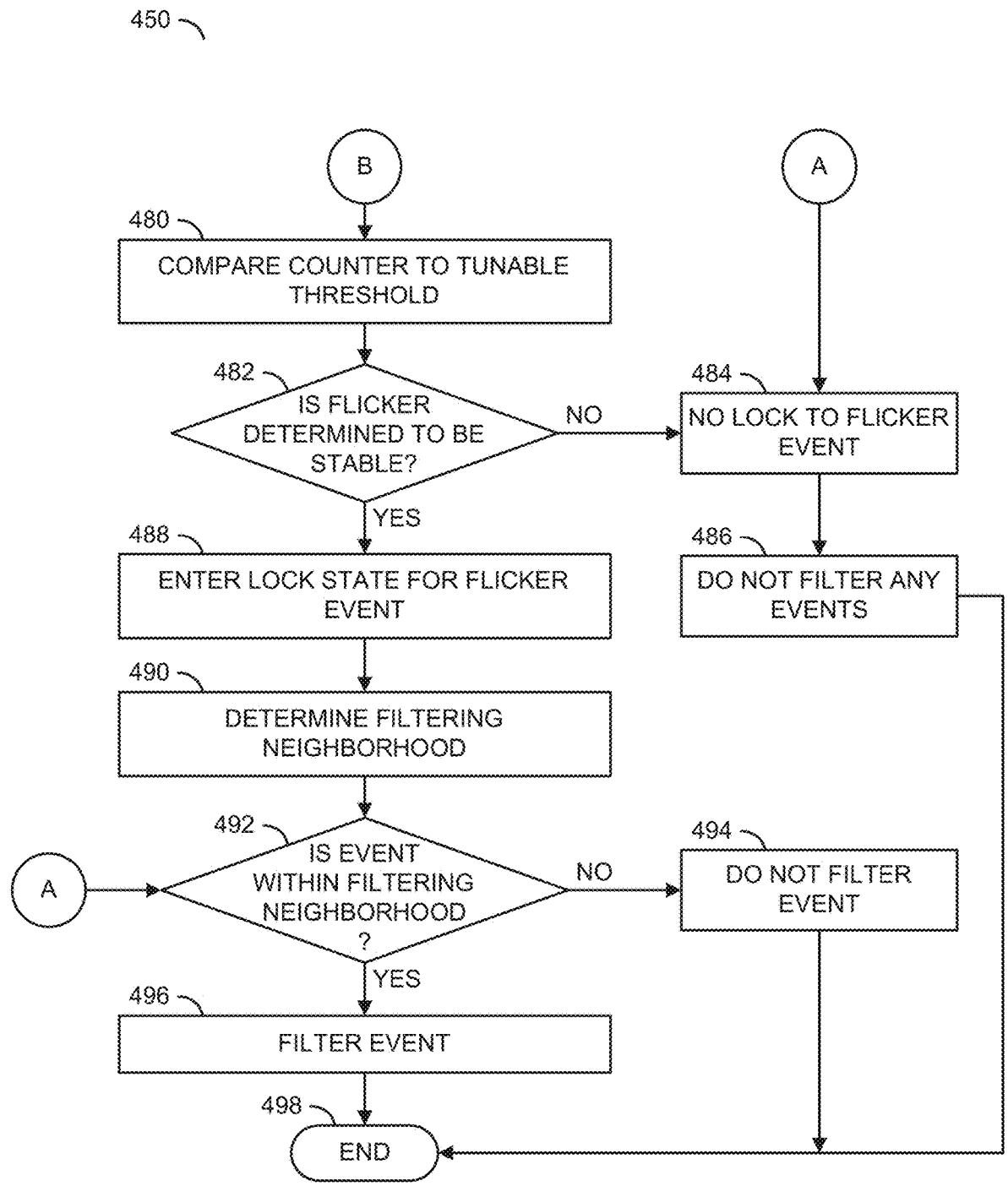
FIG. 12 is a flow diagram illustrating a method for analyzing an event stream to determine tick results and filter flicker events.

Referring to FIG. 12, the method 450 is shown. A portion of the method 450 shown in FIG. 12 may generally comprise a step (or state) 480, a decision step (or state) 482, a step (or state) 484, a step (or state) 486, a step (or state) 488, a step (or state) 490, a decision step (or state) 492, a step (or state) 494, a step (or state) 496, and a step (or state) 498.

The method 450 is partially shown in FIG. 11 and partially shown in FIG. 12. The method 450 shown in the combination of FIG. 11 and FIG. 12 may provide a high-level flow diagram of the flicker detection and/or flicker mitigation performed by the apparatus 100.

The step 452 may start the method 450. In the step 454, the processor 104 may receive the event stream EVSTM. Next, the method 450 may move to the decision step 456. In the decision step 456, the processor 104 may calculate whether an absolute value of the difference between the timestamp (e.g., ts) of one of the received events 108*a*-108*n* and the current tick result in the signal TICK is less than the value T. In an example, the processor 104 may determine whether the current event ts is within the vicinity of the neighborhood 220*a*-220*b* of the tick result 202*c*. If the current event is within the vicinity of the neighborhood 220*a*-220*b* of the tick result 202*c*, then the method 450 may move to the step 458. In the step 458, the processor 104 may update the running statistics for the in period (e.g., the number of the events 202*a*-202*n* in the neighborhood 220*a*-220*b*, the mean value of {ts−TICK} and the mean value of {(ts−TICK)2}. Next, the method 450 may move to either the step 484 (if the pattern detection module 150 has not locked to a flicker event) or the decision step 492 (if the pattern detection module 150 has locked to a flicker event). In the decision step 456, if the current event is outside of the vicinity of the neighborhood 220*a*-220*b* of the tick result 202*c* (e.g., in the silence period SP), then the method 450 may move to the decision step 460.

In the decision step 460, the processor 104 may calculate whether an absolute value of the difference between the timestamp ts of one of the received events 108*a*-108*n* and the current tick result in the signal TICK is greater than the value δT. In an example, the processor 104 may determine whether the current event ts is far outside of the vicinity of the neighborhood 220*a*-220*b* of the tick result 202*c*. For example, when the received event timestamp is far from the tick result, the processor 104 may perform the tick update. In some embodiments, the determination of whether the current event ts is far outside of the vicinity of the tick result may be determined in response to calculating whether the difference between the current event ts and the tick result TICK is greater than zero. If the current event ts is not far outside of the vicinity of the neighborhood 220*a*-220*b*, then the method 450 may move to the step 462. In the step 462, the processor 104 may update the running statistics for the out period (e.g., the number of the events 204*a*-204*b* in the silence region 222). Next, the method 450 may move to either the step 484 (if the pattern detection module 150 has not locked to a flicker event) or the decision step 492 (if the pattern detection module 150 has locked to a flicker event). In the decision step 460, if the current event ts is not far outside of the vicinity of the neighborhood 220*a*-220*b*, then the method 450 may move to the step 464. In the step 464, the processor 104 may compute the tick validation criteria. Next, the method 450 may move to the decision step 466.

In the decision step 466, the processor 104 may determine whether the tick result is valid. In an example, the processor 104 may perform the tick validation criteria to be described in association with FIG. 14. If the tick result is not valid, then the method 450 may move to the step 468. In the step 468, the processor 104 may use a previous period for the next tick result. In an example, the previous period may be a previously stored period in the memory 122, or the synchronization period Tsync. Next, the method 450 may move to the step 470. In the decision step 466, if the tick result is valid, then the method 450 may move to the step 470. In the step 470, the pattern detection module 150 may generate the next tick result (e.g., the tick result 206*c*). Next, in the step 472, the pattern detection module 150 may measure the tick period. Next, the method 450 may move to the decision step 474.

In the decision step 474, the pattern detection module 150 may determine whether the tick period is valid. In an example, the tick period may be valid if the tick period measured is within a range of possible flicker source periods. If the tick period is not valid, then the method 450 may move to the step 476. In the step 476, the pattern detection module 150 may decrement a lock state counter. Next, the method 450 may move to the step 480. In the decision step 474, if the tick period is valid, then the method 450 may move to the step 478. In the step 478, the pattern detection module 150 may increment the lock state counter. Next, the method 450 may move to the step 480. In the step 480, the processor 104 may compare the lock state counter to a tunable threshold. Next, the method 450 may move to the decision step 482.

In the decision step 482, the pattern detection module 150 may determine whether the flicker detected is stable. In an example, the flicker may be stable when the characteristic pattern for a particular duration (e.g., the lock counter reaches the tunable threshold value). If the flicker is not determined to be stable, then the method 450 may move to the step 484. In the step 484, the pattern detection module 150 may not operate with a lock to the flicker event. Next, in the step 486, none of the events 108*a*-108*n* may be filtered out by the flicker mitigation module 152 (e.g., the event ts analyzed in the decision steps 454-462 may not be filtered). Next, the method 450 may move to the step 498.

In the decision step 482, if the flicker is determined to be stable, then the method 450 may move to the step 488. In the step 488, the pattern detection module 150 may enter the lock state for the flicker event. Next, in the step 490, the flicker mitigation module 152 may determine the filtering neighborhood (e.g., the value δTF for the flicker neighborhood 260*a*-260*b*). Next, the method 450 may move to the decision step 492.

In the decision step 492, the flicker mitigation module 152 may determine whether the events 108*a*-108*n* (e.g., the event ts analyzed in the decision steps 454-462 may not be filtered) are within the filtering neighborhood 260*a*-260*b*. In an example, the flicker mitigation module may determine whether the absolute value of the difference between the current event ts and tick result 252*a* is less than the flicker neighborhood value δTF. If the event ts is not within the flicker neighborhood 260*a*-260*b*, then the method 450 may move to the step 494. In the step 494, the flicker mitigation module 152 may not filter out the event at the timestamp ts from the filtered event stream FEVSTM. Next, the method 450 may move to the step 498. In the decision step 492, if the event ts is within the flicker neighborhood 260*a*-260*b*, then the method 450 may move to the step 496. In the step 496, the flicker mitigation module 152 may filter out the event at the timestamp ts from the filtered event stream FEVSTM. Next, the method 450 may move to the step 498. The step 498 may end the method 450.

Figure 13:
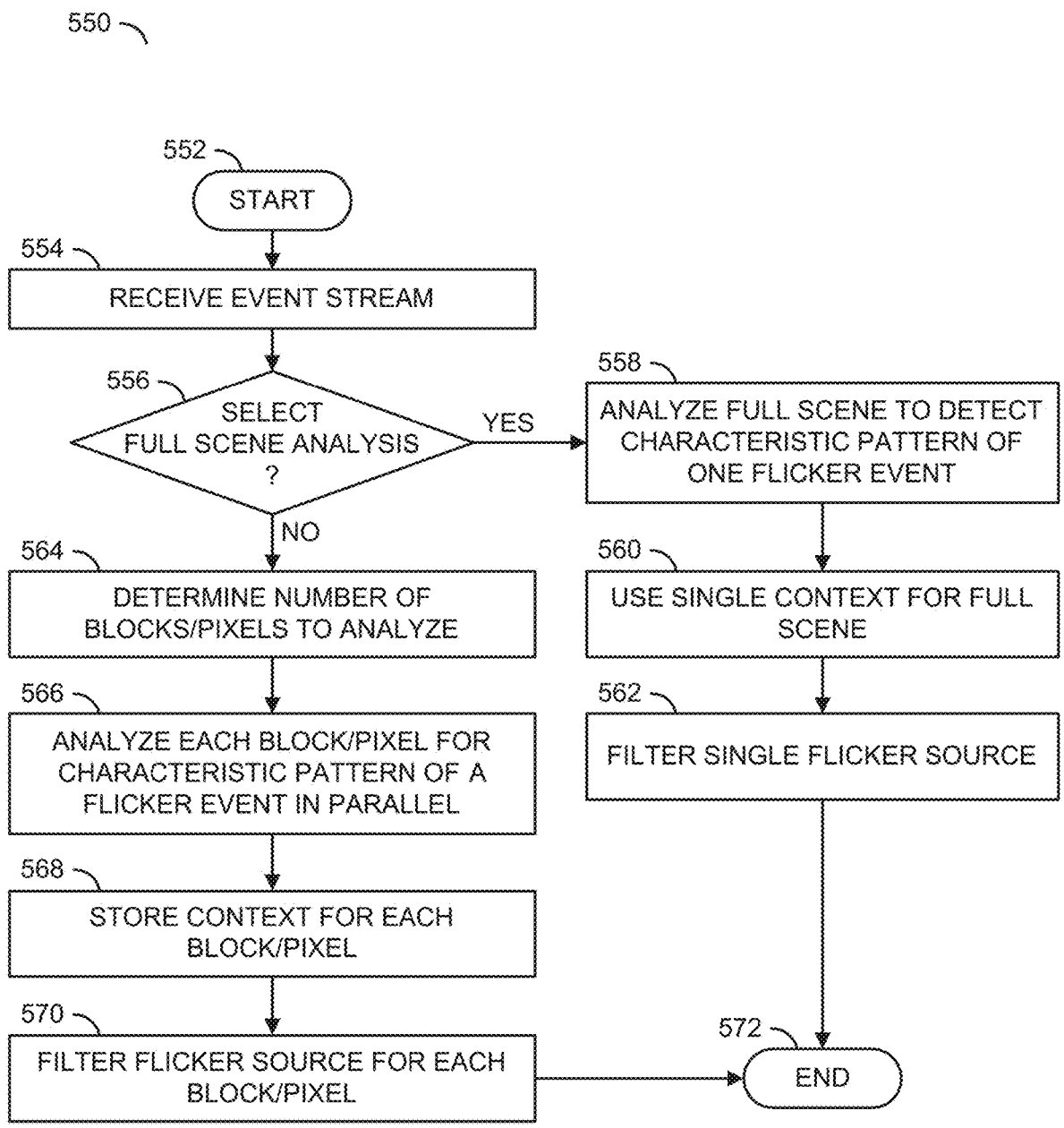
FIG. 13 is a flow diagram illustrating a method for applying filtering to a full scene or filtering to individual blocks/pixels of a scene captured by an event-based sensor.

Referring to FIG. 13, a method (or process) 550 is shown. The method 550 may apply filtering to a full scene or apply filtering to individual blocks/pixels of a scene captured by an event-based sensor. The method 550 generally comprises a step (or state) 552, a step (or state) 554, a decision step (or state) 556, a step (or state) 558, a step (or state) 560, a step (or state) 562, a step (or state) 564, a step (or state) 566, a step (or state) 568, a step (or state) 570, and a step (or state) 572.

The step 552 may start the method 550. In the step 554, the processor 104 may receive the event stream EVSTM. Next, the method 550 may move to the decision step 556.

In the decision step 556, the processor 104 may determine whether to perform full scene analysis or perform analysis on a per block/pixel basis. In one example, the signal CONFIG may enable a user to select whether the apparatus 100 performs full scene analysis or analysis on a per block/pixel basis. In another example, the processor 104 may select the per block/pixel analysis based on the capacity of the memory 122 (or whether the memory 122 is implemented). In yet another example, the processor 104 may analyze the characteristic pattern of one or more of the pixels 106a-106n to determine whether there are multiple flickering sources in the scene. If the processor 104 selects full scene analysis, then the method 550 may move to the step 558.

In the step 558, the pattern detection module 150 may analyze the full scene (e.g., the events 108a-108n generated by all of the pixels 106a-106n) in order to detect the characteristic pattern of one flicker event. For example, the entire field of view of the EB sensor 102 may be affected by a flicking light source. Next, in the step 560, the processor 104 may use one single context for the full scene (e.g., one context for all of the events 108a-108n). In the step 562, the flicker mitigation module 152 may filter out the events that correspond to the flickering light source based on the tick results for the flicker events from the single light source. Next, the method 550 may move to the step 572.

In the decision step 556, if the processor 104 selects per block/pixel analysis, then the method 550 may move to the step 564. In the step 564, the processor 104 may determine the number of blocks/pixels to analyze. In some embodiments, the field of view may be divided into subregions of clusters of the pixels 106a-106n. In some embodiments, the processor 104 may perform the analysis for each of the pixels 106a-106n. In an example, the capacity of the memory 122 may determine whether the per pixel analysis may be performed. Next, in the step 566, the pattern detection module 150 may analyze each block/pixel for an individual characteristic pattern for the flicker events. Each block/pixel may be analyzed independently and in parallel. In the step 568, the memory 122 may store a context for the characteristic pattern for each of the blocks/pixels. The signal CXT may be used to communicate the context information for each of the blocks/pixels between the processor 104 and the memory 122. Next, in the step 570, the flicker mitigation module 152 may filter out the events from the flicker source for each of the blocks/pixels. For example, multiple flickering sources may be filtered out when per block/pixel analysis is performed. Next, the method 550 may move to the step 572. The step 572 may end the method 550.

Figure 14:
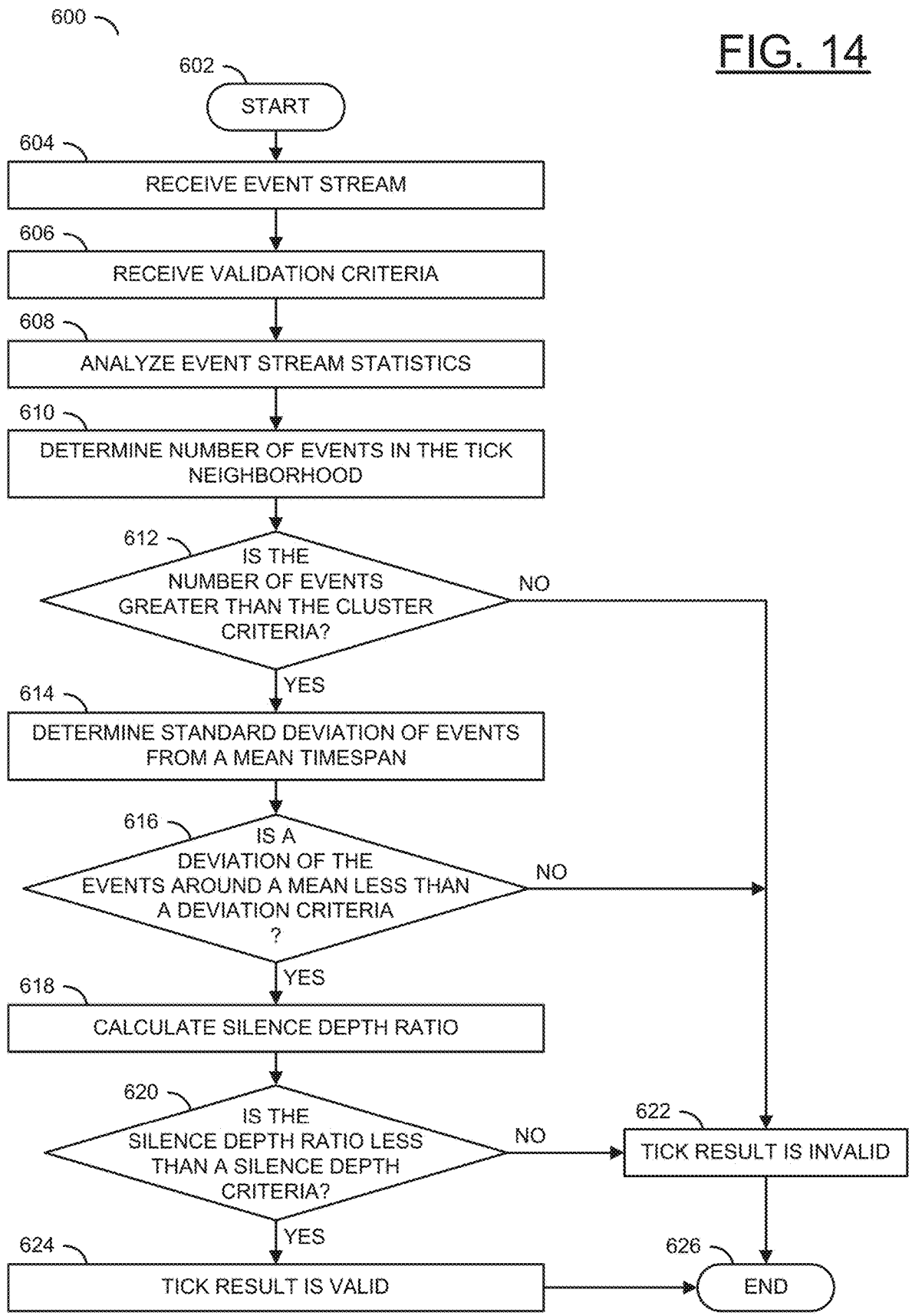
FIG. 14 is a flow diagram illustrating a method for validating tick results.

Referring to FIG. 14, a method (or process) 600 is shown. The method 600 may validate tick results. The method 600 generally comprises a step (or state) 602, a step (or state) 604, a step (or state) 606, a step (or state) 608, a step (or state) 610, a decision step (or state) 612, a step (or state) 614, a decision step (or state) 616, a step (or state) 618, a decision step (or state) 620, a step (or state) 622, a step (or state) 624, and a step (or state) 626.

The step 602 may start the method 600. In the step 604, the processor 104 may receive the event stream EVSTM. Next, in the step 606, the processor 104 may receive the validation criteria. In one example, the validation criteria may be presented in the signal CONFIG. In another example, the validation criteria may be stored in the memory 122. In yet another example, the validation criteria may be stored in registers of the processor 104. In the step 608, the processor 104 may analyze the statistics of the event stream (e.g., the number of events, the deviation from a mean, the ratio of in events to out events, etc.). Next, in the step 610, the processor 104 may determine the number of the events 202a-202n that have occurred within the tick neighborhood 220a-220b. Next, the method 600 may move to the decision step 612.

In the decision step 612, the processor 104 may determine whether the number of events within the tick neighborhood 220a-220b is greater than the cluster criteria. In an example, the cluster criteria may comprise a tunable threshold value (e.g., via the signal CONFIG). If the number of events is less than or equal to the cluster criteria, then the method 600m may move to the step 622 (e.g., the tick result may be invalid and no further testing for validation may be needed). If the cluster of events is greater than the cluster criteria, then the method 600 may move to the step 614. In the step 614, the processor 104 may determine a standard deviation of the events from a mean timespan. Next, the method 650 may move to the decision step 616.

In the decision step 616, the processor 104 may determine whether a deviation of the events around the mean timespan is less than a deviation criteria. In an example, the deviation criteria may comprise a tunable threshold value (e.g., via the signal CONFIG). If the deviation of the events around the mean timespan is greater than or equal to the deviation criteria, then the method 600 may move to the step 622 (e.g., the tick result may be invalid and no further testing for validation may be needed). If the deviation of the events around the mean timespan is less than the deviation criteria, then the method 600 may move to the step 618. In the step 618, the processor 104 may calculate the silence depth ratio. Next, the method 600 may move to the decision step 620.

In the decision step 620, the processor 104 may determine whether the silence depth ratio is less than a silence depth ratio. In an example, the silence depth ratio may comprise a tunable threshold value (e.g., via the signal CONFIG). If the silence depth ratio is greater than or equal to the silence depth criteria, then the method 600 may move to the step 622. In the step 622, the processor 104 may invalidate the tick result. Next, the method 600 may move to the step 626. In the decision step 620, if the silence depth ratio is less than the silence depth criteria, then the method 600 may move to the step 624. In the step 624, the processor 104 may determine that the tick result is valid. Next, the method 600 may move to the step 626. The step 626 may end the method 600.

In the method 600, the various criteria for the tick validation are shown performed sequentially. In some embodiments, the calculations and/or comparisons of the statistics to the validation criteria may be performed in parallel and/or substantially in parallel. In some embodiments, the order of the criteria analyzed may be varied. In some embodiments, other criteria may be used for tick validation. The types of calculations and/or order of steps to perform the tick validation may be varied according to the design criteria of a particular implementation.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

What is claimed is:

1. An apparatus comprising:
an interface configured to receive an asynchronous event stream from an event-based sensor, wherein said asynchronous event stream comprises a series of pixel locations with a timestamp each generated in response to an autonomous detection by any one of a plurality of pixel circuits of said event-based sensor exceeding a threshold; and
a processor configured to (i) detect a characteristic pattern of a flicker event in said asynchronous event stream and (ii) generate an output signal containing a tick result in response to said characteristic pattern of said flicker event, wherein
   (a) a predicted recurring interval of said flicker event is determined based on an analysis of said characteristic pattern,
   (b) said tick result comprises one or more future timestamps of said flicker event determined based on said predicted recurring interval for said timestamp of said autonomous detection of a particular one of said pixel locations,
   (c) said predicted recurring interval is determined during a lock to said flicker event,
   (d) said lock is determined when said timestamp of said flicker event is repeatedly detected during a predetermined period of time and
   (e) said lock to said flicker event during said predetermined period of time is verified based on an analysis of said characteristic pattern to ensure said flicker event comprises a periodical pattern.

2. The apparatus according to claim 1, wherein (i) before said lock to said flicker event, said processor is configured to select a sync period that is large enough to capture at least one instance of said flicker event and short enough to select only one instance of said flicker event and (ii) said processor switches from said sync period to said lock to said flicker event in response to detecting that said characteristic pattern as stable.

3. The apparatus according to claim 2, wherein said processor is configured to detect that said characteristic pattern is stable in response to (a) implementing a counter that (i) is incremented when a period for said predicted recurring interval is validated and (ii) is decremented when said period for said predicted recurring interval is not validated and (b) comparing said counter to a tunable threshold value.

4. The apparatus according to claim 3, wherein said period for said predicted recurring interval is validated by performing a comparison of said period to an expected range of possible flicker source periods.

5. The apparatus according to claim 1, wherein post-processing of said flicker event is only performed based on said tick result while said lock is verified.

6. The apparatus according to claim 1, wherein (i) said output signal is presented to a circuit and (ii) said circuit is configured to perform processing operations in response to said tick result.

7. The apparatus according to claim 1, wherein said output signal is configured to enable said tick result to be predicted for each of said pixel circuits as said predicted recurring interval occurs instead of waiting for a full video frame to be generated.

8. The apparatus according to claim 1, wherein (i) said flicker event comprises a change in luminance of a light input detected by said event-based sensor that occurs at one or more of said pixel locations at a frequency that creates a pulsing effect, (ii) said processor is further configured to suppress said change in luminance during said predicted recurring interval of said tick result and (iii) said tick result is suppressed by dropping all input from said asynchronous event stream that occurs within a range of time around said tick result.

9. The apparatus according to claim 1, wherein said characteristic pattern of said flicker event comprises a brightness fluctuation that follows a periodical pattern in a range of 10 Hz to 1000 Hz.

10. The apparatus according to claim 1, wherein said characteristic pattern of said flicker event is detected in response to (i) a detection section of time comprising a cluster of contrast changes of said autonomous detection at one of said pixel locations, (ii) a silence section of time that does not comprise said contrast changes of said autonomous detection at said one of said pixel locations, (iii) a repetition of said detection section of time and said silence section of time and (iv) said predicted recurring interval for said tick result is selected based on said timestamp of said autonomous detection being a middle time of said detection section of time.

11. The apparatus according to claim 10, wherein said tick result is validated in response to (i) comparing a first number of occurrences of said autonomous detection at said one of said pixel locations within said detection section of time to a first predetermined threshold, (ii) comparing a second number of occurrences of said autonomous detection in said cluster of contrast changes within a deviation time to a second predetermined threshold and (iii) comparing a ratio of occurrences of said autonomous detection at said one of said pixel locations between said detection section of time and said silence section of time to a third predetermined threshold.

12. The apparatus according to claim 1, wherein said processor is further configured to correct said tick result in response to (i) determining a neighborhood of events in said asynchronous event stream close to said tick result, (ii) calculating an average timestamp offset of said timestamp of each occurrence of said autonomous detection in said neighborhood of events from said tick result and (iii) adding said average timestamp offset to said predicted recurring interval for said tick result.

13. The apparatus according to claim 1, wherein (i) said tick result is generated for a region of interest of said event-based sensor and (ii) said region of interest comprises a plurality of said pixel locations.

14. The apparatus according to claim 13, wherein said plurality of said pixel locations corresponds to all of said pixel circuits of said event-based sensor.

* * * * *